(12) United States Patent  
Hayakawa et al.

(10) Patent No.: US 9,104,317 B2
(45) Date of Patent: Aug. 11, 2015

(54) COMPUTER SYSTEM AND METHOD OF CONTROLLING I/O WITH RESPECT TO STORAGE APPARATUS

(75) Inventors: Akira Hayakawa, Yokohama (JP); Takaki Nakamura, Ebina (JP); Keiichi Matsuzawa, Yokohama (JP); Takayuki Fukatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 13/522,884

(22) PCT Filed: Jun. 25, 2012

(86) PCT No.: PCT/JP2012/004094
§ 371 (c)(1),
(2), (4) Date: Jul. 18, 2012

(87) PCT Pub. No.: WO2014/002126
PCT Pub. Date: Jan. 3, 2014

(65) Prior Publication Data
US 2013/0346688 A1 Dec. 26, 2013

(51) Int. Cl.
*G06F 15/80* (2006.01)
*G06F 3/06* (2006.01)

(52) U.S. Cl.
CPC .......... *G06F 3/0611* (2013.01); *G06F 3/0647* (2013.01); *G06F 3/0659* (2013.01); *G06F 3/0685* (2013.01); *G06F 2213/3802* (2013.01)

(58) Field of Classification Search
CPC ..... G06F 3/067; G06F 3/0647; G06F 3/0665; G06F 12/02; G06F 3/0688; G06F 2212/7201; G06F 12/0895; G06F 3/061; G06F 12/0868; G06F 12/1009; G06F 3/0659; G06F 3/0683; G06F 3/0607; G06F 13/12; G06F 11/3485
See application file for complete search history.

(56) References Cited

U.S. PATENT DOCUMENTS

| | | | |
|---|---|---|---|
| 6,799,228 B2 * | 9/2004 | Mamiya et al. | 710/40 |
| 8,539,124 B1 * | 9/2013 | Burke | 710/74 |
| 2006/0265568 A1 * | 11/2006 | Burton | 711/216 |
| 2007/0283120 A1 * | 12/2007 | Fujita et al. | 711/170 |
| 2011/0145495 A1 * | 6/2011 | Yamamoto et al. | 711/112 |
| 2011/0246739 A1 | 10/2011 | Matsuda et al. | |
| 2012/0011329 A1 * | 1/2012 | Nonaka | 711/154 |
| 2012/0054407 A1 * | 3/2012 | Hayashi et al. | 711/4 |
| 2012/0159097 A1 * | 6/2012 | Jennas et al. | 711/162 |

* cited by examiner

*Primary Examiner* — Cheng-Yuan Tseng
*Assistant Examiner* — Candice Rankin
(74) *Attorney, Agent, or Firm* — Foley & Lardner LLP

(57) ABSTRACT

An aspect of this invention is a computer system, including: a storage apparatus for allocating real storage areas of a plurality of tiers of a tiered real storage area pool to a volume, and migrating and relocating data within the volume between the plurality of tiers; and a host apparatus that accesses the volume provided by the storage apparatus. The host apparatus is configured to refer to tier information including information on a corresponding one of the plurality of tiers to which an access destination address within the volume belongs to identify the corresponding one of the plurality of tiers to which the access destination address belongs and refer to settings predetermined for the plurality of tiers to perform I/O control for the access destination address based on settings of the identified corresponding one of the plurality of tiers.

13 Claims, 21 Drawing Sheets

Fig. 7

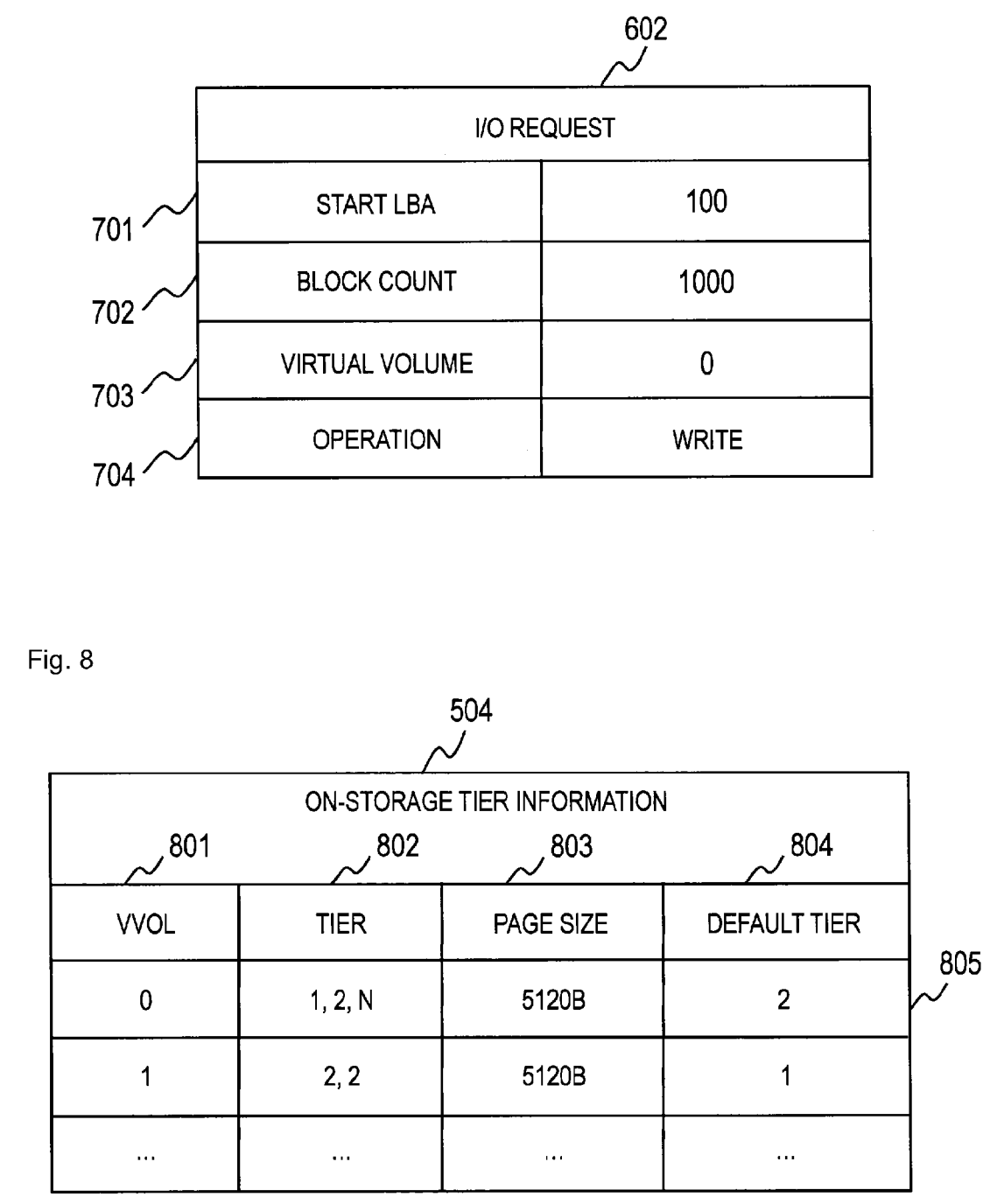

I/O REQUEST 602

| | |
|---|---|
| START LBA | 100 |
| BLOCK COUNT | 1000 |
| VIRTUAL VOLUME | 0 |
| OPERATION | WRITE |

701 — START LBA
702 — BLOCK COUNT
703 — VIRTUAL VOLUME
704 — OPERATION

Fig. 8

ON-STORAGE TIER INFORMATION 504

| VVOL | TIER | PAGE SIZE | DEFAULT TIER |
|---|---|---|---|
| 0 | 1, 2, N | 5120B | 2 |
| 1 | 2, 2 | 5120B | 1 |
| ... | ... | ... | ... |

801, 802, 803, 804, 805

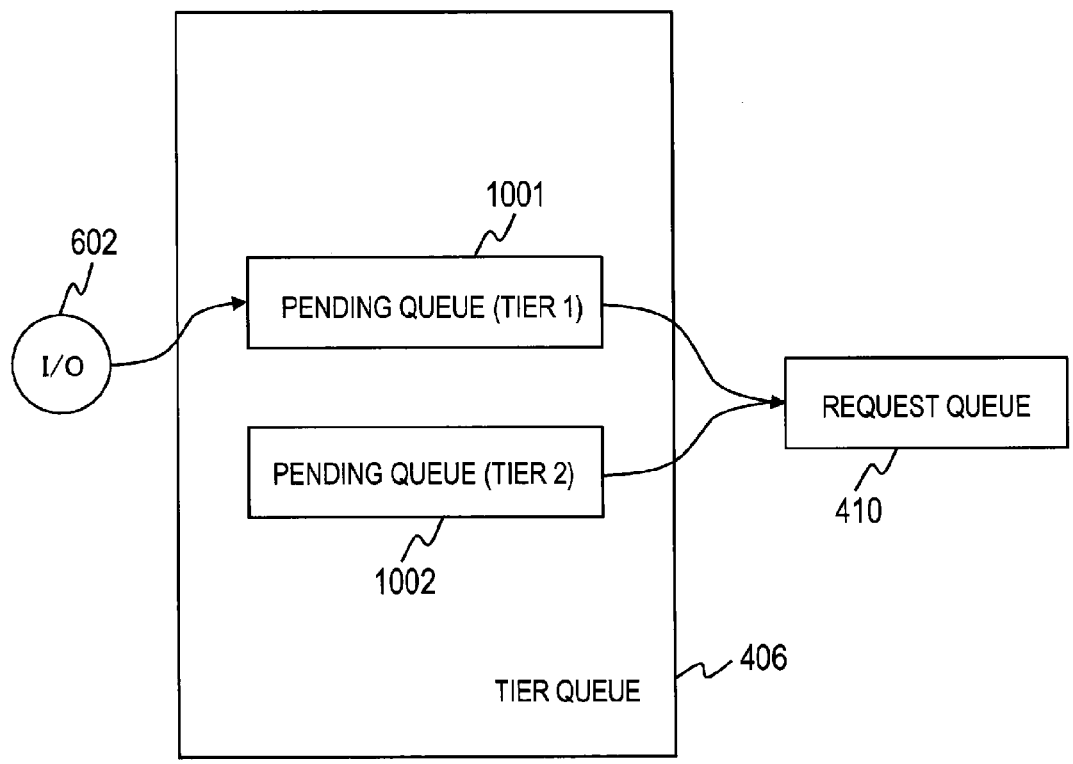

Fig. 19

| LBA-TIER MAP | |
|---|---|
| LBA | TIER |
| 0 | 1 |
| 1 | 1 |
| 2 | 1 |
| ... | ... |
| 10 | 2 |
| 11 | 2 |
| ... | ... |
| 20 | N |
| 21 | N |
| ... | ... |

COMPUTER SYSTEM AND METHOD OF CONTROLLING I/O WITH RESPECT TO STORAGE APPARATUS

TECHNICAL FIELD

This invention relates to a computer system, and a method of controlling by a host apparatus an I/O with respect to a storage apparatus.

BACKGROUND ART

As one solution based on a concept of information lifecycle management, hierarchical control on a storage apparatus is known. In this technology, storage devices managed by the storage apparatus for storing information are divided into a plurality of tiers based on its performance (such as responsiveness or reliability), cost, or the like, and the tier to be used to store the information based on a utility value thereof is selected. For example, the storage devices of the storage apparatus are, in other words, a storage area pool provided by those storage device is tiered into three tiers of Tier1, Tier2, and Tier3.

As an example of the hierarchical control, Tier1 is associated with a solid state drive (SSD), Tier2 is associated with a serial attached SCSI (SAS) hard disk drive (HDD), and Tier3 is associated with a serial ATA (SATA) HDD.

As a result of the hierarchical control, a volume is provided from the storage apparatus to an external host apparatus. The hierarchical control realizes a real capacity of the volume by allocating a real storage area from each of the tiers within the storage apparatus.

It is hidden from a user (host apparatus) of the volume how the real storage area is allocated to the volume from each of the tiers by the hierarchical control within the storage apparatus. As a result, the host apparatus can handle the volume provided by the storage apparatus equivalently to a storage area of the storage device mounted to the host apparatus.

In the hierarchical control, data is relocated by migrating the data to another tier within the volume. This allows the data to be stored in the tier appropriate based on the utility value of the data.

For example, US 2011/0246739 A1 (Patent Literature 1) discloses a hierarchical control technology in which a unit of the storage area called "page" is defined and the real storage area is allocated to the volume in units of pages. Patent Literature 1 also discloses a method involving relocating the data by migrating data between tiers.

CITATION LIST

Patent Literature

[PTL 1] US 2011/0246739 A1

SUMMARY OF INVENTION

Technical Problem

On the other hand, efficient I/O control performed by a host apparatus is inhibited due to the fact that the host apparatus that accesses a conventional storage apparatus subjected to hierarchical control does not know which tier of the storage apparatus an access destination address belongs to.

Solution to Problem

An aspect of this invention is a computer system, including: a storage apparatus for allocating real storage areas of a plurality of tiers of a tiered real storage area pool to a volume, and migrating and relocating data within the volume between the plurality of tiers; and a host apparatus that accesses the volume provided by the storage apparatus. The host apparatus is configured to refer to tier information including information on a corresponding one of the plurality of tiers to which an access destination address within the volume belongs to identify the corresponding one of the plurality of tiers to which the access destination address belongs and refer to settings predetermined for the plurality of tiers to perform I/O control for the access destination address based on settings of the identified corresponding one of the plurality of tiers.

Advantageous Effects of Invention

According to an aspect of this invention, it is possible to improve the I/O control performed by the host apparatus with respect to the storage apparatus that performs the hierarchical control.

BRIEF DESCRIPTION OF DRAWINGS

FIG. 7 is a table showing an example of a structure of a configuration example of an I/O request according to the first embodiment of this invention.

FIG. 8 shows an example of a structure of tier information (on-storage tier information) on the block storage apparatus according to the first embodiment of this invention.

FIG. 10 illustrates an example in which an I/O control program uses a tier queue to control the order of issuing the input I/O request according to the first embodiment of this invention.

FIG. 11 shows an example of a structure of I/O control program setting information according to the first embodiment of this invention.

FIG. 19 illustrates an example of a mapping table between an LBA and a tier, which is calculated in a step of calculating the tentative tier within the flowchart of the tier calculation processing of FIG. 17 according to the first embodiment of this invention.

DESCRIPTION OF EMBODIMENTS

Figure 1:
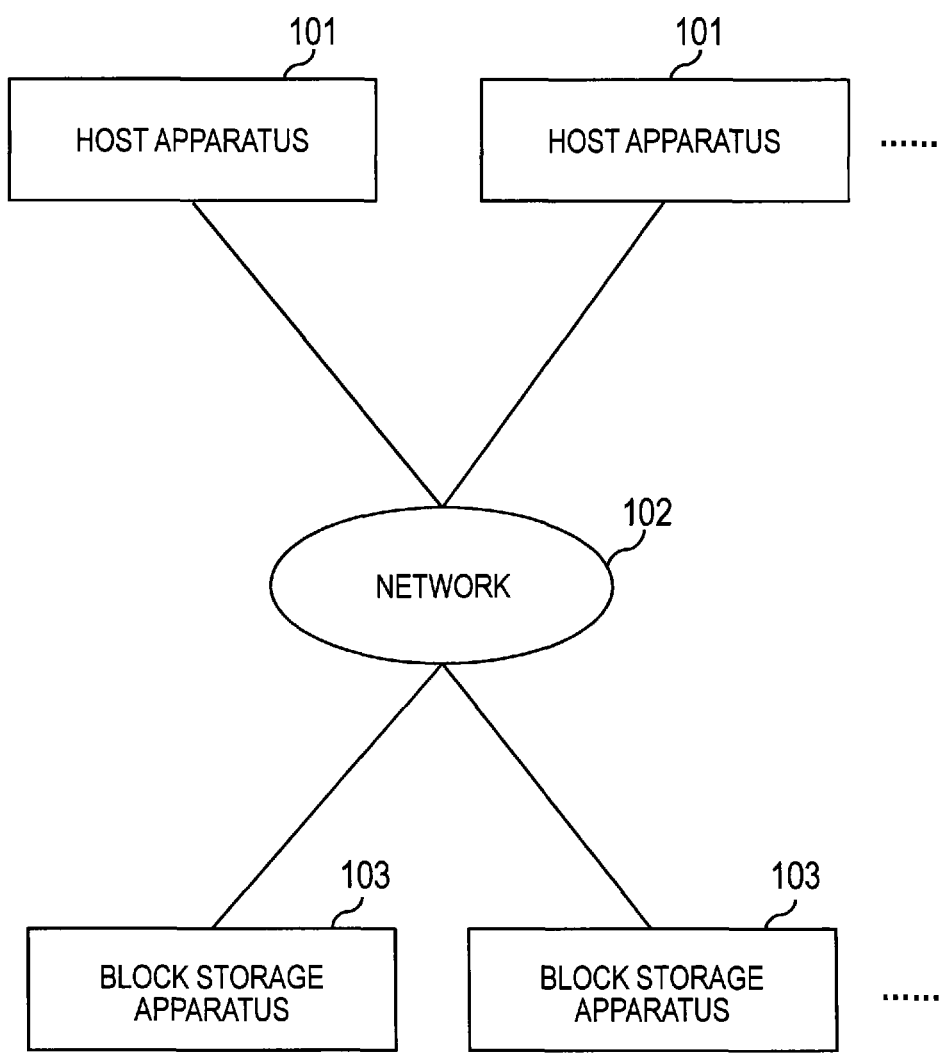
FIG. 1 is a block diagram schematically illustrating a configuration of an outline of a computer system according to a first embodiment of this invention.

Hereinafter, referring to the accompanying drawings, a description is made of embodiments of this invention. In the accompanying drawings, unless otherwise specified in particular, components that are functionally the same are denoted by the same reference symbols. The accompanying drawings illustrate specific embodiments and implementation examples in conformity with the principle of this invention, but those are used for the understanding of this invention and never used to limit the interpretation of this invention.

In the embodiments of this invention, the description thereof is made in detail enough for a person skilled in the art to carry out this invention, but it is necessary to understand that other implementations and modes are possible and that changes in configurations and structures and substitutions of diverse components can be made without departing from the scope and spirit of the technical idea of this invention. Therefore, the following description should not be interpreted by limiting thereto.

In addition, as described later, the embodiments of this invention may be implemented by software running on a general purpose computer, by dedicated hardware, or by a combination of software and hardware.

Hereinafter, information used in the embodiments of this invention is described by using the terms "table", "queue", and the like, but the information does not necessarily have to be expressed by the data structure based on the table or the queue, and may be expressed by data structures such as a list and a DB or in other such form. For that reason, "table", "list", "DB", "queue", and the like are sometimes referred to simply as "information" in order to indicate independence of the data structure. Further, the expressions "identification information", "identifier", "name", and "ID" can be used to described contents of respective pieces of information, and can be substituted with one another.

The following description is made of each processing according to the embodiments of this invention by using a "program" as a subject (operation subject), but may be made by using a processor as the subject because the program performs predetermined processing by being executed by the processor while using a memory and a network port (communication control device).

Further, the processing disclosed by using the program as the subject is also the processing performed by a computer, an information processing device, or a system. A part or an entirety of the program may be realized by dedicated hardware or may be modularized. Different kinds of program may be installed into the computer, the information processing device, or the system through a program distribution server or a non-transitory storage medium.

The processor operates as functional units that realize predetermined functions by operating in accordance with programs. For example, the processor functions as a control unit by operating in accordance with a control program, and functions as a management unit in accordance with a management program. An apparatus or a system that includes the processor is an apparatus or a system that includes those functional units.

According to the host apparatus of the embodiments of this invention, more appropriate I/O control is realized by identifying the tier to which the access destination address within the volume belongs and performing the I/O control relating to the access destination address based on the identified tier.

For example, it is assumed that a plurality of I/O requests are issued from the host apparatus to the storage apparatus and that the I/O request with respect to Tier2 (low speed) precedes the I/O request with respect to Tier1 (high speed). Processing for the I/O request with respect to Tier1 (high speed) waits until processing for the I/O request with respect to Tier2 (low speed) is finished. The term "tier" relates to a hierarchical control technology, and represents a class for classifying real storage devices and storage areas of those based on the performance (access performance or reliability) of the real storage devices.

It is supposed here that it takes 100 milliseconds to process the I/O request with respect to Tier2 (low speed) and 2 milliseconds to process the I/O request with respect to Tier1 (high speed). Then, the response time of the I/O request with respect to Tier2 (low speed) is 100 milliseconds, and the response time of the I/O request with respect to Tier1 (high speed) is 102 (100+2) milliseconds. Therefore, an average response time of those two I/O requests is 101 milliseconds.

On the other hand, in a case where the order of issuing those I/O requests is reverse, the response time of the I/O request with respect to Tier1 (high speed) is 2 milliseconds, and the response time of the I/O request with respect to Tier2 (low speed) is 102 (2+100) milliseconds. The average response time thereof is 52 milliseconds. In this embodiment, an I/O response can be improved by issuing the I/O request to the high-speed tier prior to the I/O request with respect to the low-speed tier.

EXAMPLE 1

FIG. 1 is a block diagram schematically illustrating a configuration of an outline of a computer system according to a first example of this invention. The computer system includes at least one host apparatus (hereinafter, referred to also as "host") 101, at least one block storage apparatus 103, and a data network 102 for coupling those to one another. The numbers of host apparatus and block storage apparatus that can be included in the computer system depend on designs thereof.

The host apparatus 101 and the block storage apparatus 103 are communicably coupled to one another through the data network 102. The host apparatus 101 accesses a resource of the block storage apparatus 103.

An example of the host apparatus 101 is a file server apparatus, and a more specific example thereof is a network attached storage (NAS) gateway or a NAS head that includes a file system and a controller for the block storage apparatus 103. In this example, the computer system including the host apparatus 101 and the block storage apparatus 103 constitutes one storage system, and a client apparatus accesses the file server apparatus (host apparatus 101) at a front end and stores data in the block storage apparatus 103 via the file server apparatus (the host apparatus 101).

Further another example of the host apparatus 101 is a task server apparatus having a task application program executed thereon, and the task server apparatus (host apparatus 101) stores task data in the volume provided by the block storage apparatus 103, and reads the task data from the volume.

The data network 102 is a network for data communications, and examples thereof include a storage area network (SAN). The data network 102 is not only the SAN but may also be any network for data communications. For example, the data network 102 may be a local area network (LAN) or a wide area network (WAN). The data network 102 may be a wired network or a wireless network.

The host apparatus 101 and the block storage apparatus 103 use a protocol such as internet protocol (IP), iSCSI, or fibre channel (FC) to perform communications of data on the data network 102.

Figure 2:
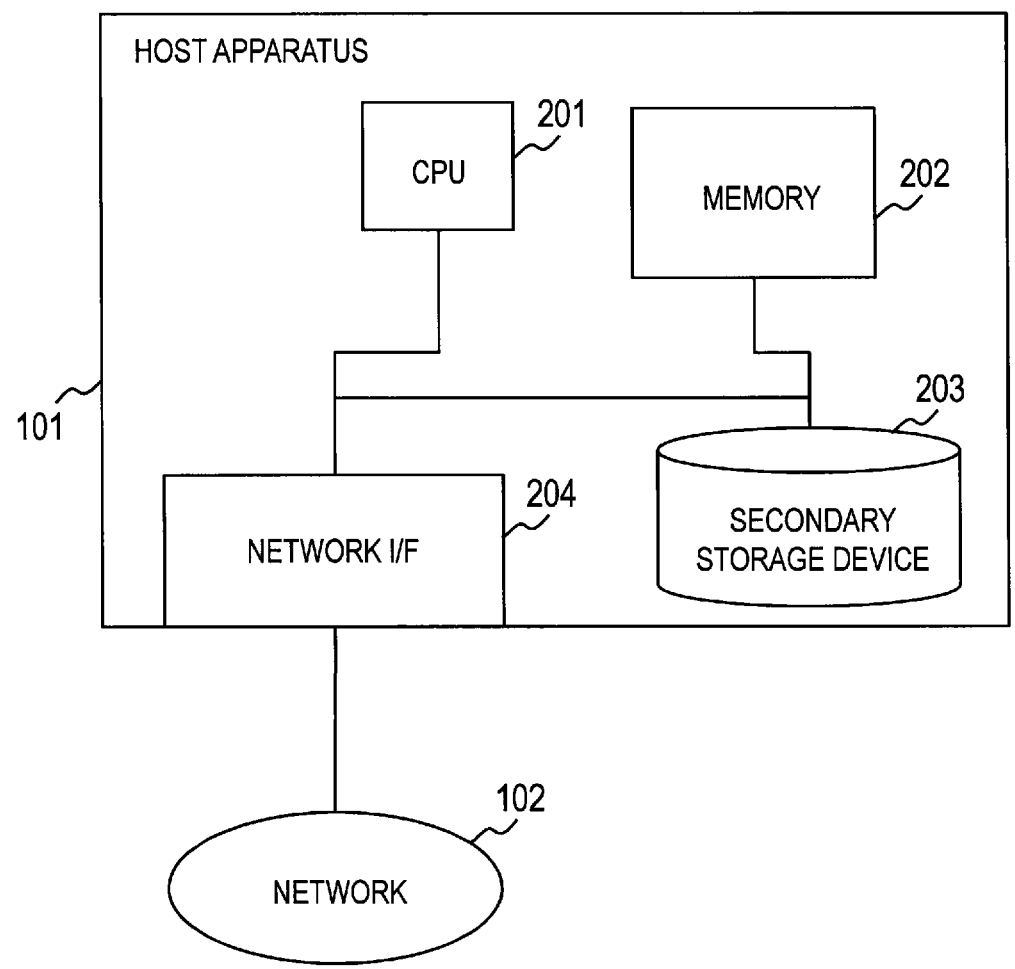
FIG. 2 is a block diagram schematically illustrating a hardware configuration example of a host apparatus according to the first embodiment of this invention.

FIG. 2 is a block diagram schematically illustrating a hardware configuration example of the host apparatus 101. The host apparatus 101 of this embodiment is a computer, and includes a CPU 201 being a processor, a memory 202 being a main storage device, a secondary storage device 203, and a network interface (I/F) 204. Those are communicably coupled to one another through an internal bus.

The CPU 201 calls a program stored in the memory 202, performs processing by operating in accordance with the program, and realizes a predetermined function of the host apparatus 101. The memory 202 stores programs executed by the CPU 201 and information (data) necessary for execution of the programs. As described later, the program includes an OS (not shown) in addition to programs described later with reference to FIG. 4.

The network interface 204 is, for example, a network interface card (NIC) or a host bus adapter (HBA). The network interface 204 is coupled to the data network 102, and the host apparatus 101 uses the network interface 204 to transmit/receive data to/from the block storage apparatus 103 via the data network 102. The host apparatus 101 may be any apparatus (general purpose computer, file server apparatus, tablet computer, or the like) that issues an I/O request to the block storage apparatus 103.

Figure 3:
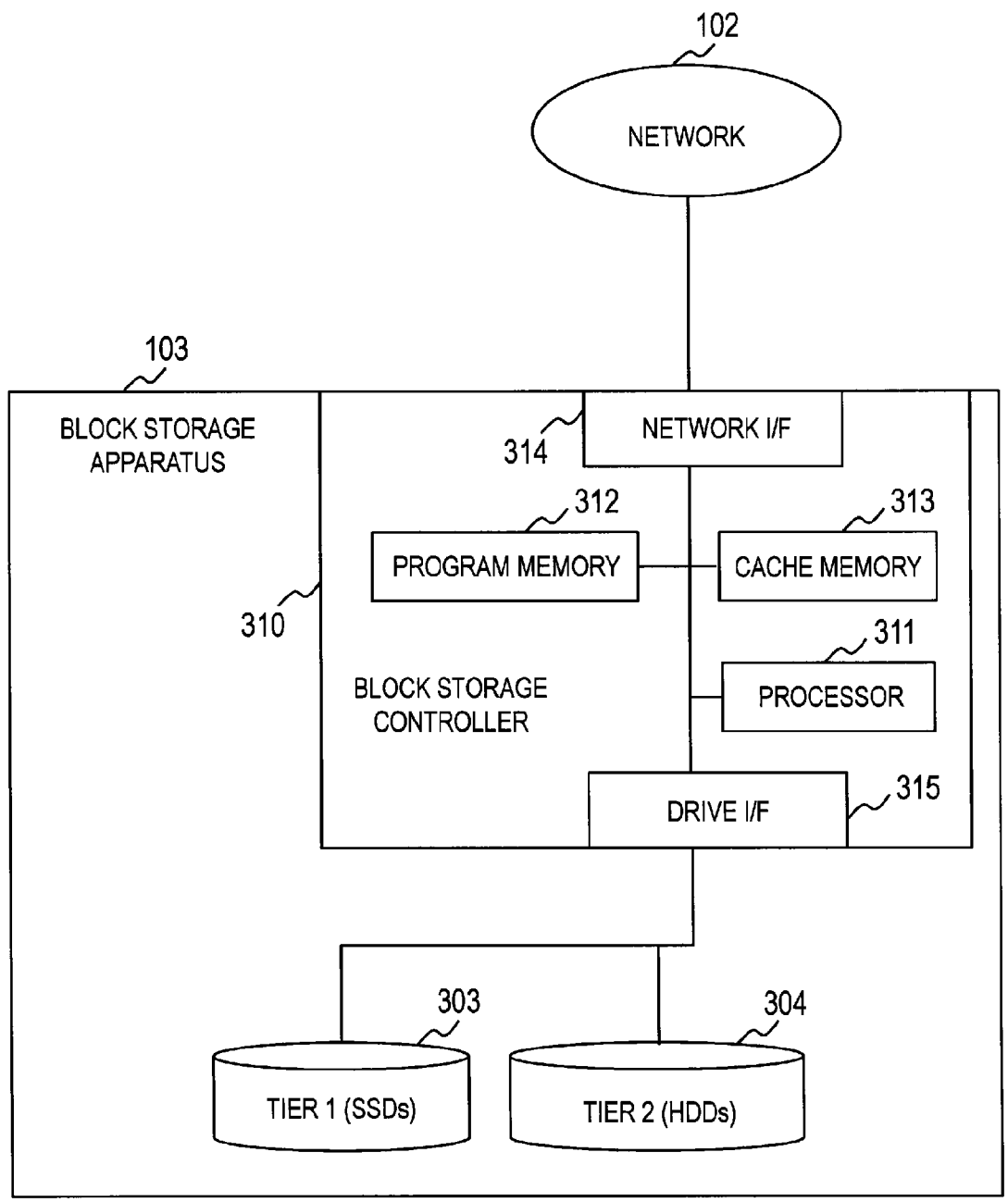
FIG. 3 is a block diagram schematically illustrating a hardware configuration example of a block storage apparatus according to the first embodiment of this invention.

FIG. 3 is a block diagram schematically illustrating a hardware configuration example of the block storage apparatus 103. The block storage apparatus 103 includes a block storage controller 310, a storage drive group 303 belonging to the tier Tier1, and a storage drive group 304 belonging to the tier Tier2. The storage drives to which the different tiers belong are different in type.

The storage drive group 303 belonging to the tier Tier1 is, for example, a group of SSDs. The storage drive group 304 belonging to the tier Tier2 is, for example, a group of HDDs. The storage area provided by the storage drive group 303 is the storage area of Tier1, and the storage area provided by the storage drive group 304 is the storage area of Tier2. The response time of the SSD exhibits higher speed than the response time of the HDD.

The block storage controller 310 includes a processor 311, a program memory 312, a cache memory 313, a network interface 314 for data, and a drive I/F 315. Those are communicably coupled to one another through an internal bus. In this embodiment, the block storage controller 310 includes the processor 311 that operates in accordance with the program.

The processor 311 (block storage controller 310) executes a control program to thereby realize predetermined functions including the I/O control from the host apparatus 101 and management control of the volume of the block storage apparatus 103. The program memory 312 stores programs in accordance with which the processor 311 operates and information (data) used by the programs.

The processor 311 calls the program within the program memory 312 being the main storage device, and performs processing by operating in accordance with the program. As described above, at least a part of the functions executed by the processor 311 may be realized by a dedicated circuit.

The cache memory 313 temporarily stores data (user data) on the host apparatus 101. Specifically, the cache memory 313 temporarily stores the user data (write data) received from the host apparatus 101, then transfers the write data to the storage drive group 303 or 304, and temporarily stores the user data (read data) transferred from the storage drive group 303 or 304 to the host apparatus 101.

The drive I/F 315 has a function of converting a protocol used for communications between the storage drive group 303 or 304 and the block storage controller 310, such as FC, serial attached SCSI (SAS), or serial advanced technology attachment (SATA), into a protocol used inside the block storage controller 310, for example, PCIe.

The network interface 314 for data is coupled to the data network 102, and has a function of converting the protocol used for the communications on the network 102 into the protocol used inside the controller 310.

Figure 4:
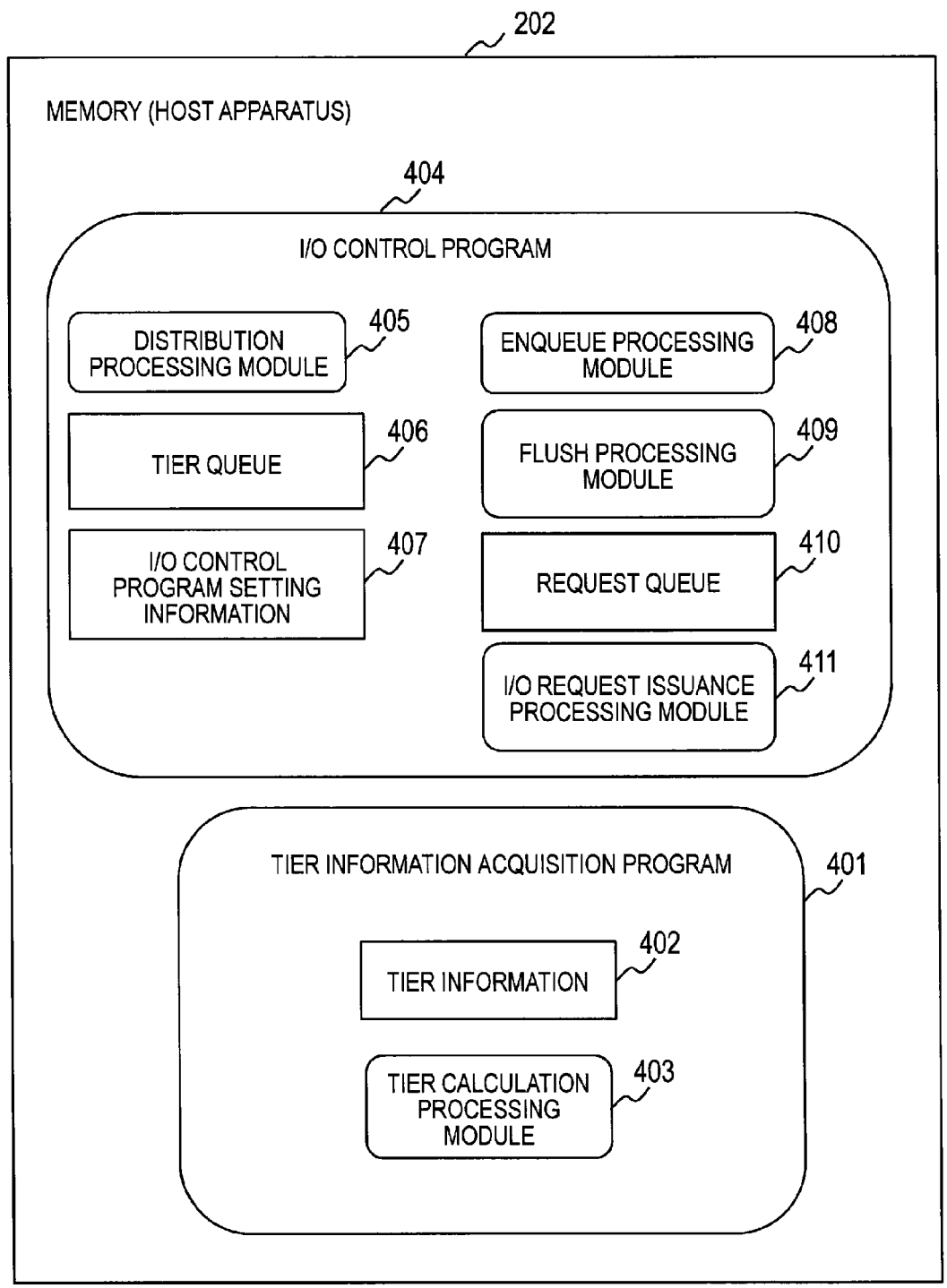
FIG. 4 illustrates a configuration example of programs and information (data) stored in a memory of the host apparatus according to the first embodiment of this invention.

FIG. 4 illustrates a configuration example of the programs and the information (data) stored in the memory 202 of the host apparatus 101. The memory 202 stores a tier information acquisition program 401 and an I/O control program 404. The tier information acquisition program 401 includes tier information 402 and a tier calculation processing module 403.

The I/O control program 404 includes a distribution processing module 405, a tier queue 406, I/O control program setting information 407, an enqueue processing module 408, a flush processing module 409, a request queue 410, and an I/O request issuance processing module 411. An inclusion relation of components illustrated in FIG. 4 is exemplified to facilitate the understanding, and does not mean that a given component including another component is composed only of the component included by the given component.

For convenience of description, the programs are illustrated within the memory 202 being the main storage device, but typically, the programs are loaded from the secondary storage device 203 onto the memory 202. The memory 202 and the secondary storage device 203 can function as one storage device.

The secondary storage device 203 is a storage device including a non-volatile non-transitory storage medium, which stores programs and data necessary to realize predetermined functions. The secondary storage device 203 may be an external storage device coupled via the network. The same point applies to the block storage apparatus 103 and other computers (for example, management server apparatus 104 according to the second embodiment).

Figure 5:
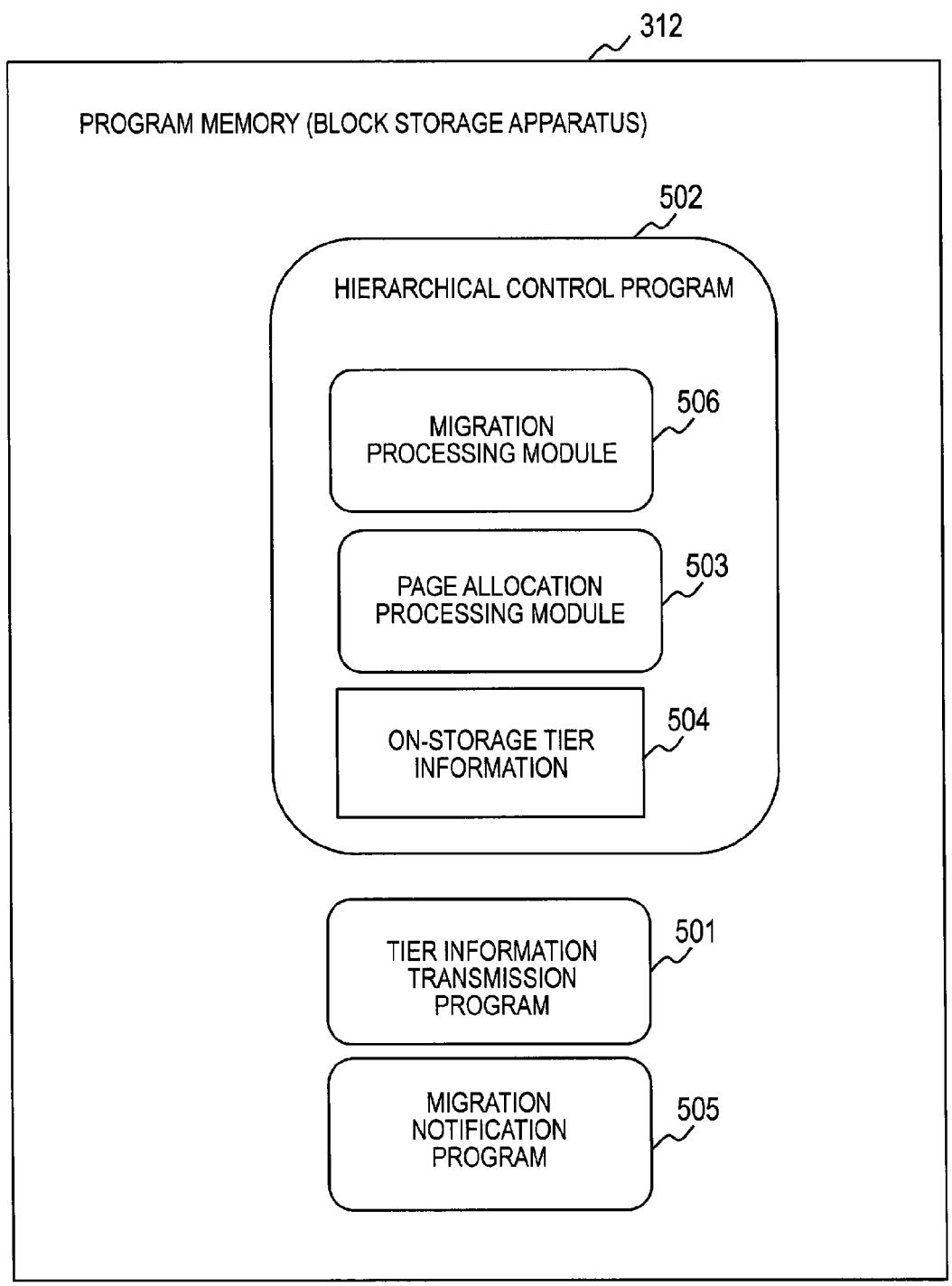
FIG. 5 illustrates a configuration example of programs stored in a program memory of the block storage apparatus and information (data) used by the programs according to the first embodiment of this invention.

FIG. 5 illustrates a configuration example of programs stored in the program memory 312 of the block storage apparatus 103 and information (data) used thereby. The program memory 312 stores a tier information transmission program 501, a hierarchical control program 502, and a migration notification program 505.

The hierarchical control program 502 includes a page allocation processing module 503, on-storage tier information 504, and a migration processing module 506. The hierarchical control program 502 performs the hierarchical control and makes public the virtual volume 351 to an external of the block storage apparatus. Processing of the hierarchical control program 502 is described later in detail.

Figure 6:
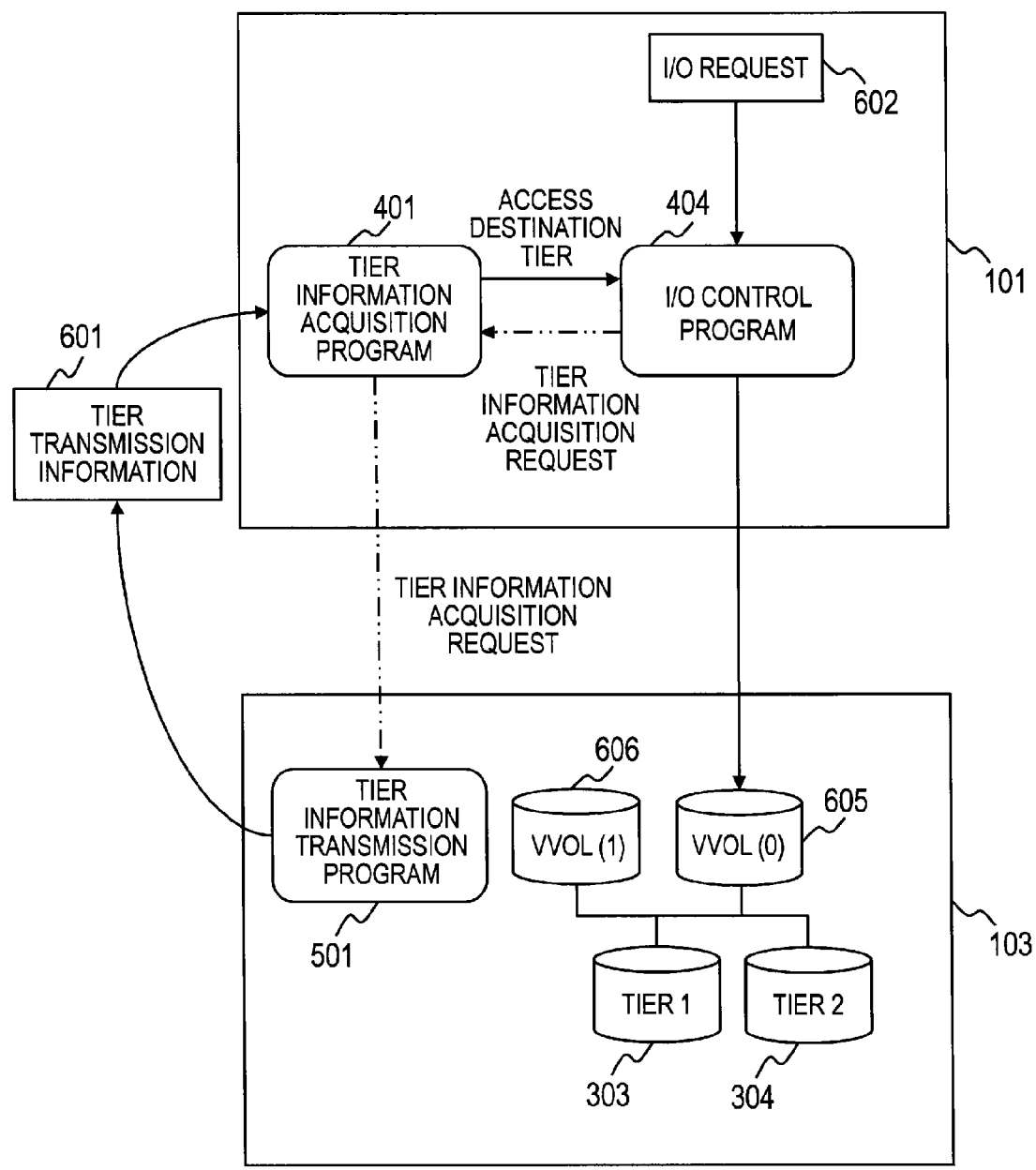
FIG. 6 is a diagram schematically illustrating an outline of I/O execution processing according to the first embodiment according to the first embodiment of this invention.

FIG. 6 is a diagram schematically illustrating an outline of I/O execution processing according to the first embodiment. FIG. 6 illustrates operations of the I/O control program 404, the tier information acquisition program 401, and the tier information transmission program 501. In this embodiment, the host apparatus 101 accesses a virtual volume VVOL(0) 605. The storage areas are allocated to the virtual volume VVOL(0) 605 from Tier1 (303) and Tier2 (304). In the same manner, the storage areas are allocated to a virtual volume VVOL(1) 606 from Tier1 (303) and Tier2 (304).

The host apparatus 101 issues (transmits) an I/O request 602 for the virtual volume VVOL(0) 605, which is shown in FIG. 7, to the block storage apparatus 103. First, the program that uses the virtual volume VVOL(0) 605 in order to store the user data issues (passes) the I/O request 602 to the I/O control program 404. The I/O request 602 designates, as described later, the volume of the access destination and an address area thereof. In the example described below, the access destination storage area designated by the I/O request 602 is included in a single tier. Handling of the I/O request whose access destination belongs to a plurality of tiers is described in the last part of this embodiment.

When acquiring the I/O request 602, the I/O control program 404 requests the tier information from the tier information acquisition program 401. This tier information includes information representing the tier to which the access destination address area belongs. The I/O control program 404 causes the information on the access destination included in the I/O request 602 to be included in the request with respect to the tier information acquisition program 401.

In response to an acquisition request for the tier information received from the I/O control program 404, the tier information acquisition program 401 requests tier transmission information 601 from the block storage apparatus 103. In response to the received request, the tier information transmission program 501 of the block storage apparatus 103 transmits the tier transmission information 601 to the host apparatus 101. The tier transmission information 601 is described later in detail with reference to FIG. 16, and an example thereof indicates a relationship between each virtual page within the virtual volume VVOL(0) 605 and the corresponding tier.

The tier information acquisition program 401 calculates an access destination tier requested by the I/O control program 404, and returns information representing the access destination tier to the I/O control program 404. For example, the tier information acquisition program 401 identifies the virtual page within the access destination address area from the information on the access destination address area acquired from the I/O control program 404, and further identifies the tier to which an access destination virtual page belongs by referring to the tier transmission information 601.

In this manner, the tier information acquisition program 401 has a function of acquiring information relating to the tiers of an access destination volume from the block storage apparatus 103 and returning the information on the tiers in response to a query made from the external. The tier information transmission program 501 has a function of returning the information relating to the tiers on the block storage apparatus 103 in response to a query made by another program. The I/O control program 404 uses the acquired information on an access destination tier to perform the I/O control for the access destination. The I/O control is described later.

FIG. 7 is a table showing an example of a structure of the I/O request 602. The I/O request 602 is issued from the host apparatus 101 to the block storage apparatus 103. In this embodiment, the I/O request 602 includes a field 701 for a start logical block address (LBA), a field 702 for the number of requested blocks, a field 703 for designating the volume serving as a destination to which the I/O request is issued, and a field 704 that indicates an operation type of the I/O.

The field 703 for designating the volume stores an identifier of an access destination virtual volume. In this embodiment, the host apparatus 101 uses an LBA to designate the address area within the access destination volume. The unit of the address area accessed by the host apparatus 101 is called "block", and a size thereof is, for example, 512 bytes.

In the example of FIG. 7, the start address (LBA) of the access destination storage area is 100, and the size of the address area is 1000 blocks. Here, the access destination address is formed of the start address and the block count. The field 704 indicating the operation type stores a value indicating a type of I/O, and specifically, designates read or write. The I/O request 602 of this embodiment is the writing of data, and the host apparatus 101 transmits the user data (write data) to be written to the volume, along with the I/O request 602.

FIG. 8 shows an example of a structure of the tier information (on-storage tier information) 504 on the block storage apparatus 103. The on-storage tier information 504 includes information on the tier configuration of each of the virtual volumes provided by the block storage apparatus 103. The tier configuration indicates a relationship between each page and the tier to which the page belongs. The tier information transmission program 501 generates the tier transmission information 601 illustrated in FIG. 16 from the on-storage tier information 504.

In this embodiment, the on-storage tier information 504 has a table structure, and includes a virtual volume column 801, a tier column 802, a page size column 803, and a default tier column 804. One entry stores information on the tiers to which all the virtual pages within one virtual volume belong, a page size, a default tier defined for the one virtual volume.

The virtual volume column 801 stores the identifier of each of the virtual volumes provided by the block storage apparatus 103. The program is allowed to acquire the information on the entry with the identifier (column 801) of the virtual volume as a key.

In each entry, the tier column 802 stores the information on the tier to which each of the pages within the virtual volume of the entry belongs. For example, a virtual volume 0 of an entry 805 is structured by three virtual pages, and the tiers allocated to the respective virtual pages are Tier1, Tier2, and TierN. The meaning of TierN is described later.

The page size column 803 defines the size of the virtual pages in the hierarchical control on the virtual volume in each entry. In this embodiment, all the virtual volumes have the same size of the virtual pages, which is 5,120 bytes. One page corresponds to 10 blocks.

Figure 9:
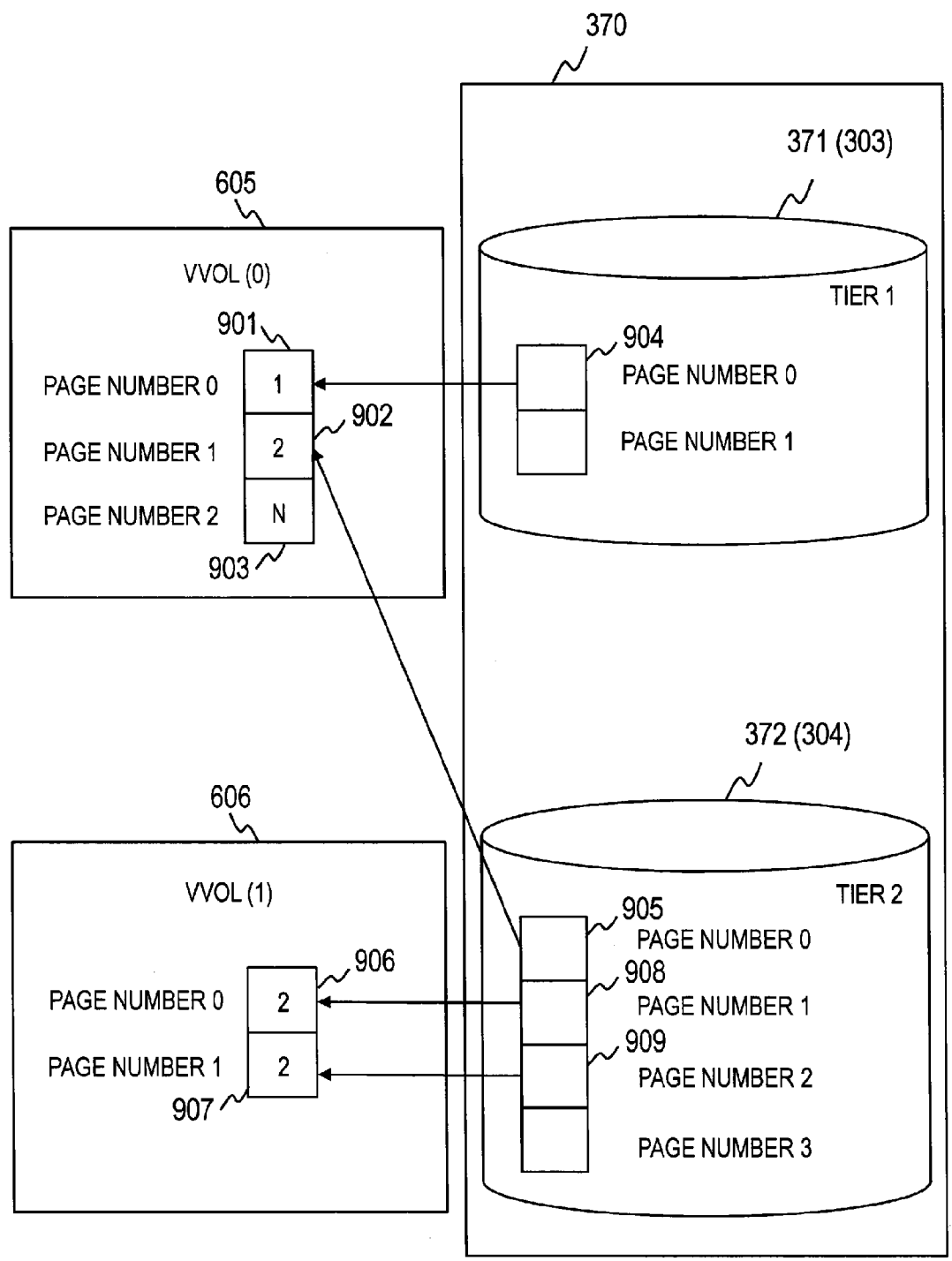
FIG. 9 illustrates an outline of the hierarchical control performed by the hierarchical control program according to the first embodiment of this invention.

FIG. 9 illustrates an outline of the hierarchical control performed by the hierarchical control program 502. FIG. 9 schematically illustrates a logical structure of the volume provided by the block storage apparatus 103 to the host apparatus 101 and a relationship between the volume and the storage drive groups 303 and 304 (tiers 371, 372).

The block storage controller 310 builds a pool 370 including a plurality of unit storage areas (pages). The pool 370 is tiered into a plurality of storage tiers that are different in performance. In this embodiment, the pool 370 is structured by two storage tiers 371 and 372 (Tier1 and Tier2). Further, the storage area of Tier1 (371) is structured by the storage area of the storage device of a first type, in this embodiment, the SSD, and an access speed thereof is fast. The storage area of Tier2 (372) is structured by the storage area of the storage device of a second type, in this embodiment, the HDD, and an access speed thereof is slower than in the case of Tier1 (371). The types of the storage devices that structure the respective tiers are not only the HDD and the SSD but may also be an optical disc drive, a tape drive, a flash memory, and the like.

In the pool 370, each of the tiers is structured by a plurality of pages. The page represents a unit of the storage area used in the management of the virtual volume 351 and the pool 370. The volumes provided to the host apparatus 101 are the virtual volumes 605, 606 and the capacities are virtualized. Each time a data storage area becomes necessary because of writing to the virtual volume 605 or 606 performed by the host apparatus 101, the block storage controller 310 allocates a real page to the virtual volume 605 or 606.

The virtual volume VVOL(0) 605 is structured by three virtual pages, and the virtual volume VVOL(1) 606 is structured by two virtual pages. In each of the virtual volumes 605 and 606 and the tiers 371 and 372, sequential page numbers are assigned to the pages. In the virtual volumes 605 and 606, a number within a rectangle indicating the virtual page indicates the tier to which the virtual page belongs.

A real page 904 of the page number "0" within Tier1 (371) is allocated to a virtual page 901 of the page number "0" within the virtual volume VVOL(0) 605. A real page 905 of the page number "0" within Tier2 (372) is allocated to a virtual page 902 of the page number "1". No real page is allocated to a virtual page 903 of the page number "2". The virtual page to which no real page is allocated (unallocated virtual page) is handled as a virtual page belonging to TierN (as shown in the on-storage tier information 504 of FIG. 8).

A real page 908 of the page number "1" and a real page 909 of the page number "2" within Tier2 (372) are allocated to virtual pages 906 and 907 of the page numbers "0" and "1", respectively, within the virtual volume VVOL(1) 606.

When there is access to the unallocated virtual page, the page allocation processing module 503 of the block storage apparatus 103 allocates the real page to the virtual page. There are various methods of allocating the real page to the unallocated virtual page, and in this embodiment, the real page of the default tier defined for the virtual volume is allocated. As shown in FIG. 8, the on-storage tier information 504 defines the default tier for each virtual volume (column 804).

When there is access to the virtual volume, the page allocation processing module 503 identifies the tier of the access destination by referring to the on-storage tier information 504. In a case where the tier is TierN, the real page is unallocated to the virtual page of the access destination, and hence the page allocation processing module 503 identifies the default tier of the virtual volume by referring to the on-storage tier information 504 to allocate the real page of the tier to the access destination virtual page.

The default tier is defined for the virtual volume, and hence even if the access destination of the I/O request is the unallocated virtual page, the host apparatus 101 can identify the access destination tier of the I/O request.

For example, in the example of FIG. 9, it is assumed that access to the virtual page 903 of the page number "2" within the virtual volume VVOL(0) 605 is made from the host apparatus 101. By referring to the on-storage tier information 504, the page allocation processing module 503 identifies that the default tier for the virtual volume VVOL(0) 605 is Tier2. The page allocation processing module 503 allocates the real page from Tier2 to the virtual page 903.

The hierarchical control program 502 of the block storage apparatus 103 relocates the data in the virtual volume within the block storage apparatus 103. In this embodiment, the migration processing module 506 migrates the data between the tiers, and relocates the data within the virtual volume.

For example, the block storage controller 310 monitors I/Os with respect to all the real pages (in this example, total number of read accesses and write accesses) in the tiered pool 370 within the block storage apparatus 103 during a predetermined period (monitoring period), and stores an I/O count thereof. Based on the I/O count (IOPS) of each page within the pool 370 during the monitoring period, the block storage controller 310 relocates the data of the pages to the top level tier in an order from the data of the page having the largest IOPS (inter-tier relocation).

In the data relocation using the inter-tier data migration, the migration processing module 506 changes a mapping relationship between the virtual page and the real page. The migration processing module 506 changes the mapping relationship between the virtual page and the real page based on statistics of access to the respective virtual pages.

For example, the block storage apparatus 103 includes management information for managing the mapping between the virtual page and the real page, and by referring to the management information, identifies the real page mapped to the access destination virtual page and updates the management information based on the change of the mapping.

When the inter-tier data migration is performed, the tier to which the virtual page belongs (which is allocated to the virtual page) is changed. In this embodiment, the host apparatus 101 acquires the information on the tier to which the access destination address area belongs, and performs the I/O control in accordance therewith, to thereby realize more appropriate I/O control.

The following description is directed to the operation of the I/O control program 404 of the host apparatus 101. The I/O control program 404 performs the I/O control with respect to the block storage apparatus 103. In this embodiment, based on the access destination tier of the I/O request, the I/O control program 404 controls the order of issuing the I/O requests to the block storage apparatus 103.

FIG. 10 illustrates an example in which the I/O control program 404 uses the tier queue 406 to control the order of issuing the input I/O request 602. The tier queue 406 includes pending queues 1001 and 1002 corresponding to the tiers Tier1 and Tier2, respectively. In FIG. 10, a pending queue corresponding to TierM is expressed as a pending queue (TierM).

The tier queue 406 (sets of pending queues) may be prepared for each virtual volume, or one tier queue 406 may be shared by a plurality of virtual volumes.

When acquiring the I/O request 602, the distribution processing module 405 within the I/O control program 404 refers to the information representing the tier of the access destination of the I/O request 602. As described above referring to FIG. 6, the distribution processing module 405 can acquire the information representing the tier of the access destination from the tier information acquisition program 401.

The distribution processing module 405 identifies the tier of the access destination of the acquired I/O request 602, and stores the acquired I/O request 602 in the pending queue for the identified access destination tier. In the example of FIG. 10, the I/O request 602 is stored in the pending queue (Tier1) 1001. The distribution processing module 405 identifies the access destination tier as Tier1 from the information acquired from the tier information acquisition program 401, and stores the I/O request 602 in the pending queue (Tier1) 1001.

In this embodiment, migrating the I/O request from the pending queue to the request queue 410 is referred to as "enqueuing the I/O request". The I/O requests enqueued in the request queue 410 are issued to the block storage apparatus 103 in an enqueued order by the I/O request issuance processing module 411.

The enqueue processing module 408 controls the enqueuing of the I/O request stored in the pending queue. The enqueue processing module 408 enqueues, for example, the I/O request with respect to Tier1 with a higher priority than the I/O request with respect to Tier2. This can reduce the average response time of the I/O with respect to the virtual volume. Enqueuing control performed by the enqueue processing module 408 is not limited thereto.

FIG. 11 is an example of a structure of the I/O control program setting information 407. The I/O control program 404 performs queuing control of the I/O request which is different on a tier-by-tier basis, based on settings defined in the I/O control program setting information 407. The I/O control program setting information 407 of this embodiment has a table structure and defines the settings of the queuing control for each of the tiers.

The I/O control program setting information 407 includes a VVOL column 1101, an interval (Tier1) column 1102, an upper limit count (Tier1) column 1103, an interval (Tier2) column 1104, and an upper limit count (Tier2) column 1105.

The VVOL column 1101 stores the identifier of the virtual volume (VVOL). The interval (Tier1) column 1102 and the interval (Tier2) column 1104 store values of intervals in the enqueuing of the I/O requests for Tier1 and Tier2, respectively. The upper limit count (Tier1) column 1103 and the upper limit count (Tier2) column 1105 store values of upper limit counts in the enqueuing of the I/O requests for Tier1 and Tier2, respectively.

From the I/O control program setting information 407, the intervals (column 1102 and column 1104) and the upper limit counts (column 1103 and column 1105) can be acquired with the identifier of the virtual volume as a key. The interval (TierM) and the upper limit count (TierM) are setting items relating to the pending queue (TierM). Those settings may be set by a user, or may be set automatically from the statistics of access and the like. Those settings may be dynamically changed while the system is in operation.

The interval represents an interval between two enqueue processings for enqueuing the I/O request from the pending queue to the request queue. The upper limit count represents an upper limit value of a count of I/O requests that can be input to the request queue in one enqueue processing for enqueuing the I/O request from the pending queue to the request queue.

For example, the interval for the pending queue (Tier1) 1001 is 10 ms, and the upper limit count is 10. When the interval of 10 ms has elapsed since the previous enqueue processing, the enqueue processing module 408 enqueues one or a plurality of I/O requests stored in the pending queue (Tier1) 1001 to the request queue 410.

At this time, a maximum number of I/O requests input to the request queue 410 is 10.

When the count of the I/O requests stored in the pending queue (Tier1) 1001 is equal to or larger than 10, the count of the I/O requests to be enqueued is 10, and when the count is less than 10, all the I/O requests are enqueued.

As the interval becomes shorter, the priority on the enqueuing of the I/O request becomes higher. As the upper limit count becomes larger, the priority on the enqueuing of the I/O request becomes higher. The priorities on two pending queues can be compared with each other by the number of I/O requests thereof that can be enqueued per unit time. By controlling the enqueuing of the pending queues (I/O requests of the tiers) based on the settings of the intervals and the upper limit counts, the order of issuing the I/O requests to a plurality of tiers can be appropriately controlled in accordance with the priorities of the respective tiers. The upper limit count may be excluded from the items that can be set for each tier, but when a large number of I/O requests are queued in the pending queue with high priority, the enqueue processing that allows the above-mentioned two items to be set can issue an I/O request in the pending queue with low priority without waiting for the completion of all I/O requests in the pending queue with high priority.

Figure 12:
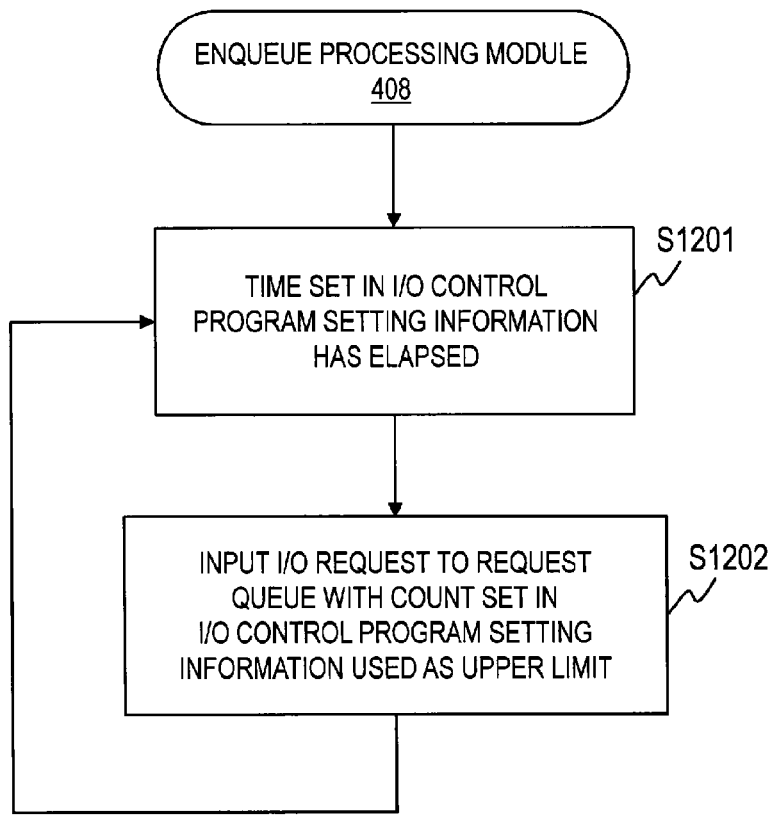
FIG. 12 is a flowchart illustrating an example of processing of an enqueue processing module according to the first embodiment of this invention.

FIG. 12 is a flowchart illustrating an example of processing of the enqueue processing module 408. This flowchart illustrates the enqueue processing for the I/O request of one pending queue. The enqueue processing module 408 executes a flow thereof for each of the pending queues.

The enqueue processing module 408 waits until a predefined interval has elapsed since the previous enqueuing (S1201). As described above, the enqueue processing module 408 can obtain a set value of the interval for the pending queue from the I/O control program setting information 407.

When a predefined time has elapsed since the previous enqueuing, the enqueue processing module 408 inputs the I/O request stored in the pending queue to the request queue 410 (S1202). As described above, the count of the enqueued I/O requests is defined in the I/O control program setting information 407. After the inputting of the I/O requests is finished, the enqueue processing module 408 returns to Step S1201, and stands by for a set interval from the pending queue to the next enqueuing (S1202).

The enqueue processing may operate independently of each pending queue. In the enqueue processing, in order to preferentially issue the I/O request of Tier1, the I/O request of Tier1 may be enqueued in the request queue 410 as soon as the I/O request of Tier1 is input to the pending queue 1001, and the I/O request of Tier2 may be enqueued unless the I/O request of Tier1 is left pending.

In one example, during standby, the enqueue processing module 408 performs scheduling for the pending I/O requests on the pending queue. In I/O request scheduling, the I/O requests are sorted or merged within the pending queue. This improves the response time from the storage drive.

For example, in the pending queue of the tier in which sequential access performance is higher than random access performance, the enqueue processing module 408 sorts the I/O requests so that the access destination address can monotonously change, and merges the I/O requests within a continuous address area. In this manner, the enqueue processing module 408 can lower randomness of access.

The enqueue processing module 408 may perform the I/O request scheduling for the respective pending queues of all the tiers, or may perform the I/O request scheduling for only a part thereof. The enqueue processing module 408 avoids performing the I/O request scheduling for the pending queue that produces a small effect of the I/O request scheduling, thereby reducing the overhead of the I/O request scheduling.

For example, the enqueue processing module 408 avoids performing the I/O request scheduling for the tier (for example, tier formed of the storage area of the SSD) high in the random access performance, and performs the I/O request scheduling for the tier (for example, tier formed of the storage area of the HDD) low in the random access performance. Setting items that define presence/absence of execution of sorting of the I/O requests and presence/absence of execution of merging may be added to the I/O control program setting information 407, and the presence/absence of execution of those may be allowed to be set.

Another example of the I/O control performed by the host apparatus 101 by using the information on the access destination tier is control of the disk cache. In this cache control, the information on the tier of the access destination is applied to a destage policy for data within the cache area (cache memory).

In conventional disk cache control, the data to be cached (stored) in the cache area and the data to be destaged are selected without taking no notice of the tier in which the data is stored. In disk cache control according to this embodiment, data cache (storing the data in the cache area or destaging the data from the cache area) is controlled based on the tier in which the data is stored, to thereby enable more appropriate disk cache control and improve response performance for the data stored in the volume.

In the disk cache, the I/O control program 404 temporarily stores, in the storage area within the host apparatus 101, the user data stored in the volume provided by the block storage apparatus 103. The user data to be cached is data that has already been stored, or has not yet been stored, in the volume provided by the block storage apparatus 103. The destaged data includes data written to the volume of the block storage apparatus 103 and data erased without being written thereto.

Typically, the cache area is formed on a volatile semiconductor memory (for example, memory 202), but may be formed on the non-volatile secondary storage device 203. With regard to the cached data, the host apparatus 101 accesses the cache area without accessing the block storage apparatus 103. The response performance is improved by appropriately selecting the user data to be cached in the cache area (to be caused to exist in the cache area).

In one example, the I/O control program 404 destages, from the cache area, the data of the tier high in the access performance with a higher priority than the data of the tier low in the access performance. This can reduce an increase in cost due to the caching of the user data again.

In other words, cost for staging the user data from the volume to the cache area (the cache cost) is higher in Tier2 low in the performance than in Tier1 high in the performance. For that reason, the cost for caching the user data again after destaging the user data from a disk cache area is higher in the case of the user data of Tier2 than in the case of the user data of Tier1.

Accordingly, it is effective to employ a policy that the cache data of Tier1 is destaged from the cache area with a higher priority than the cache data of Tier2. For example, the I/O control program 404 manages the cached data in the cache area on a tier-by-tier basis. In the destaging of the cache data from the cache area, the I/O control program 404 destages more data of Tier1 than data of Tier2.

As an algorithm for determining data to be destaged, the I/O control program 404 can use an arbitrary algorithm such as least recently used (LRU) or most recently used (MRU). The I/O control program 404 selects data to be destaged from each of the cache data of Tier1 and the cache data of Tier2 in accordance with the used algorithm.

At this time, the I/O control program 404 selects more cache data from the cache data of Tier1. This method of managing the cache data on a tier-by-tier basis can reduce a search space for the cache data, and is therefore effective for a speedup of a cache search as well.

Figure 13:
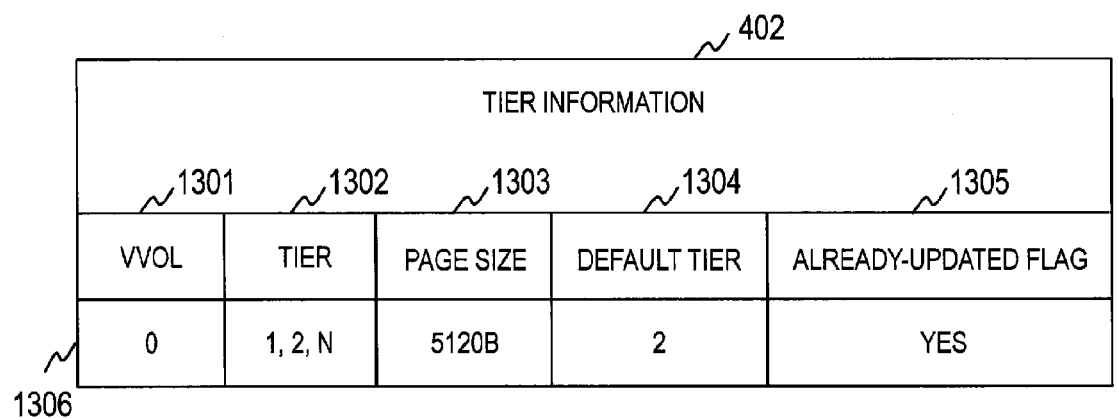
FIG. 13 shows an example of a structure of tier information included in the host apparatus according to the first embodiment of this invention.

FIG. 13 shows an example of a structure of the tier information 402 included in the host apparatus 101. In the example of FIG. 13, the tier information 402 is formed of information on one virtual volume (VVOL(0)). The tier information 402 can include information on each of all the virtual volumes that are accessed by the host apparatus 101. The tier information acquisition program 401 creates and updates the tier information 402.

In the example of FIG. 13, the tier information 402 includes a VVOL column 1301, a tier column 1302, a page size column 1303, a default tier column 1304, and an already-updated flag column 1305. It is possible to acquire the information on the respective columns of the entry from the tier information 402 with a virtual volume identifier of the VVOL column 1301 as a key.

The columns 1301 to 1304 of the tier information 402 correspond to the columns 801 to 804, respectively, within the on-storage tier information 504. Specifically, the VVOL column 1301 corresponds to a VVOL column 801, the tier column 1302 corresponds to the tier column 802, the page size column 1303 corresponds to the page size column 803, and the default tier column 1304 corresponds to the default tier column 804.

In the tier information 402, an already-updated flag relating to the entry (virtual volume) within the tier information 402 is retained in the already-updated flag column 1305. A method of using the already-updated flag is described later.

Figure 14:
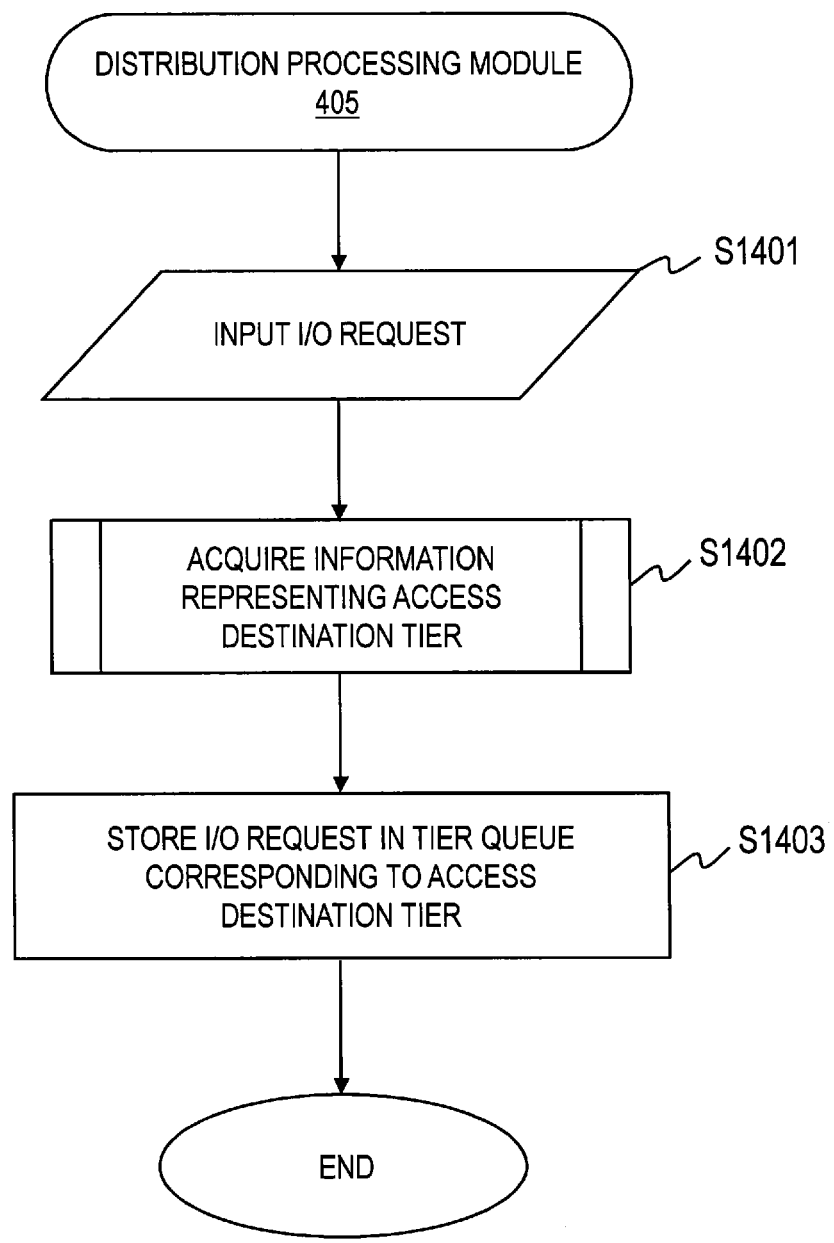
FIG. 14 is a flowchart of an example of processing executed by a distribution processing module of the host apparatus according to the first embodiment of this invention.

FIG. 14 illustrates a flowchart of an example of processing executed by the distribution processing module 405 of the host apparatus 101. As described above, the distribution processing module 405 identifies the access destination tier of the acquired I/O request, and inputs the I/O request to the pending queue of the access destination tier.

Specifically, when receiving the input I/O request (S1401), the distribution processing module 405 acquires information representing the access destination tier of the I/O request (S1402). Step S1402 of acquiring the information representing the access destination tier is described later. The distribution processing module 405 stores the I/O request in the pending queue corresponding to the identified access destination tier (S1403).

Figure 15A:
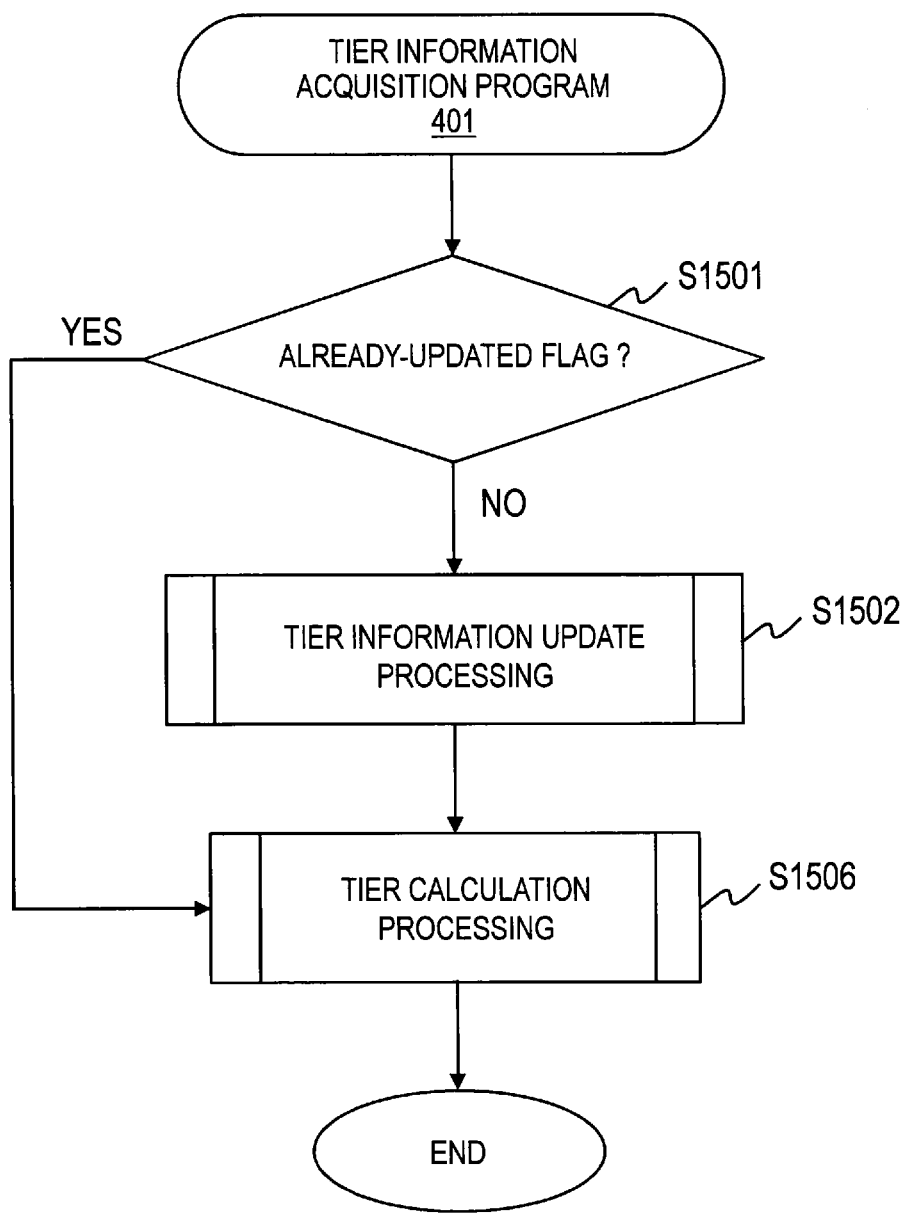
FIG. 15A is a flowchart illustrating an example of processing performed by a tier information acquisition program according to the first embodiment of this invention.

FIG. 15A is a flowchart illustrating an example of processing performed by the tier information acquisition program 401. As described above, the tier information acquisition program 401 receives the tier transmission information 601 from the tier information transmission program 501 of the block storage apparatus 103, and uses the information to create and update the tier information 402 on the host apparatus 101. In this flow, it is assumed that the tier information 402 has already been created.

Specifically, first, by referring to the tier information 402, the tier information acquisition program 401 sees the already-updated flag column 1305 within the entry for the access destination virtual volume. When the already-updated flag in the field is "NO" ("NO" in S1501), the tier information acquisition program 401 updates the tier information 402 (S1502). The updating of the tier information 402 is described later.

Through the use of the already-updated flag to control the updating of the tier information 402, it is possible to update the tier information 402 at an appropriate timing (on an appropriate condition) conforming to the design. In another example, the tier information 402 may be updated each time there is a request without using the already-updated flag.

After updating the tier information 402, the tier information acquisition program 401 uses the tier calculation processing module 403 to calculate the tier of the access destination of the I/O request, and returns information representing the calculated tier to the I/O control program 404 (1506).

On the other hand, in Step S1501, when the already-updated flag in the field within the tier information 402 is "YES" ("YES" in S1501), the tier information acquisition program 401 does not have to update the tier information 402, and therefore skips Step S1502.

Figures 15B, 16:
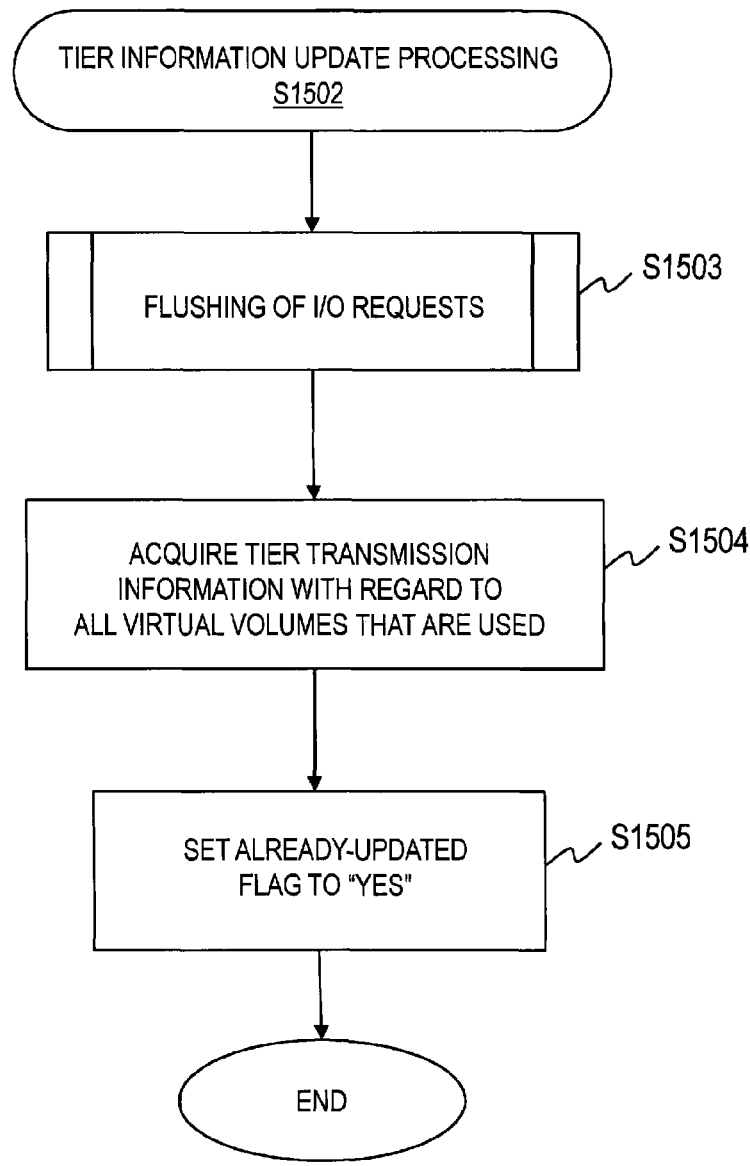
FIG. 15B is a flowchart illustrating tier information update processing according to the first embodiment of this invention.
FIG. 16 shows an example of a structure of tier transmission information transmitted from a tier information transmission program according to the first embodiment of this invention.

FIG. 15B is a flowchart illustrating details of tier information update processing (S1502). In the tier information update processing (S1502), the tier information acquisition program 401 first uses the I/O control program 404 to enqueue (also referred to as "flush") all the I/O requests left pending in the tier queue 406 to the request queue 410 (S1503). In this embodiment, the pending I/O requests within all the virtual volumes used by the host apparatus 101 are flushed.

Subsequently, the tier information acquisition program 401 acquires the tier transmission information 601 for all the virtual volumes used by the host apparatus 101 (S1504). The tier information acquisition program 401 designates the virtual volumes to request the tier information transmission program 501 of the block storage apparatus 103 for the tier transmission information.

After that, the tier information acquisition program 401 sets all the flags of the already-updated flag column 1305 within the tier information 402 to "YES", to thereby record the fact that the tier information 402 has been updated.

Step S1503 is necessary in order to prevent both the I/O request stored based on the tier information 402 that has not been updated and the I/O request stored based on the tier information 402 that has been updated from existing within the tier queue 406 and to eliminate a possibility of causing improper data. The tier information acquisition program 401 may set the value of the already-updated flag column 1305 to "NO" at an arbitrary timing determined in advance. For example, after a predefined time has elapsed since the previous update of the entry, the tier information acquisition program 401 switches the value of the already-updated flag column 1305 of the entry to "NO".

In the above-mentioned embodiment, the tier information for all the virtual volumes used by the host apparatus 101 is updated simultaneously. Alternatively, the tier information acquisition program 401 may update the tier information 402 only for a part of the virtual volumes.

For example, the tier information acquisition program 401 flushes all the I/O requests only for the virtual volume with regard to which a query for the access destination tier has been received, and further refers to the already-updated flag for the virtual volume to request, when the already-updated flag is "NO", the block storage apparatus 103 for the tier information on the virtual volume. The tier information acquisition program 401 updates the entry for the virtual volume within the tier information 402 based on the received tier transmission information, and switches the already-updated flag to "ON".

The tier information acquisition program 401 can acquire the tier information from the block storage apparatus 103 at the arbitrary timing set in advance. In the example referring to FIG. 6, in response to the request received from the I/O control program 404 at the time of issuing the I/O request, the tier information acquisition program 401 acquires necessary tier information (tier transmission information). The tier information acquisition program 401 may acquire the information from the block storage apparatus 103 at a time different therefrom, and may update the tier information 402 by selecting a timing at which an influence exerted on other processing is small.

FIG. 16 illustrates an example of a structure of the tier transmission information 601 transmitted from the tier information transmission program 501. The tier information transmission program 501 transmits a record (entry) corresponding to the requested virtual volume from the on-storage tier information 504. In the example of FIG. 16, the tier information transmission program 501 is requested for the information (tier information) on the tier configuration relating to the virtual volume VVOL(0) 605, and therefore transmits a record 805 of the on-storage tier information 504 shown in FIG. 8.

Therefore, the structure of the tier transmission information 601 illustrated in FIG. 16 is the same as the structure of the record 805 of the on-storage tier information 504. The columns 1601 to 1604 of the tier transmission information 601 correspond to the columns 801 to 804, respectively, of the on-storage tier information 504.

In this embodiment, the host apparatus 101 acquires the information on the page size of the virtual volume and the default tier for the virtual volume from the block storage apparatus 103 along with information representing a relationship between the page and the tier, but the page size and the default tier may not be received every time. Alternatively, the page size and the default tier are set in the host apparatus 101 in advance, and may not be acquired from the block storage apparatus 103.

Figure 17:
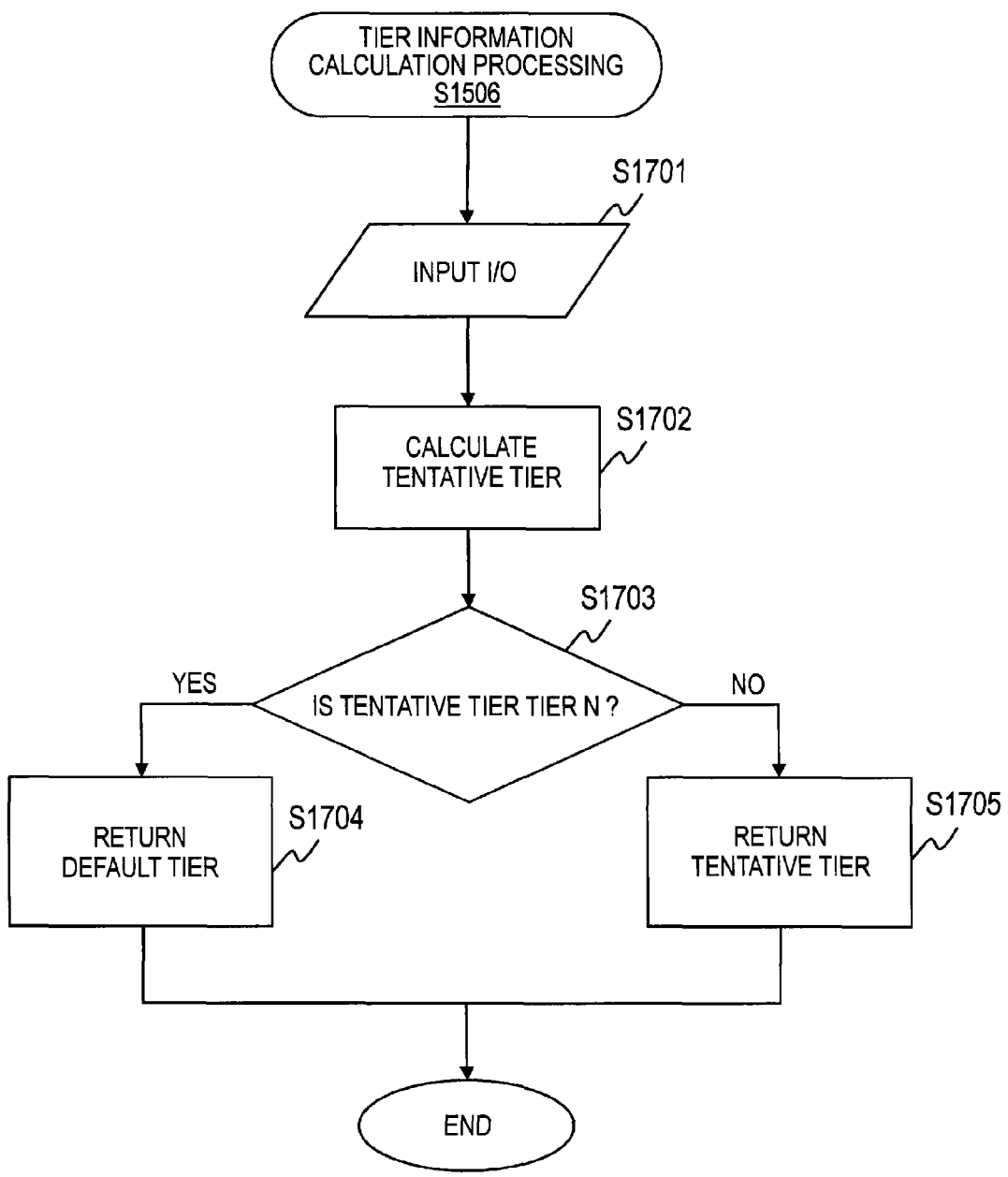
FIG. 17 is a flowchart illustrating tier calculation processing within the flowchart of FIG. 15A according to the first embodiment of this invention.

FIG. 17 is a flowchart illustrating tier calculation processing of Step S1506 within the flowchart of FIG. 15A. The tier calculation processing module 403 of the host apparatus 101 executes this flow. Specifically, first, the tier calculation processing module 403 acquires the input I/O request (S1701), and calculates a tentative tier of the access destination of the I/O request (S1702). A method of calculating the tentative tier is described later referring to FIG. 18.

Subsequently, the tier calculation processing module 403 determines whether or not the calculated tentative tier is TierN, in other words, whether or not the access destination virtual page is an unallocated page (S1703). When a determination result of Step S1703 is "YES", the tier calculation processing module 403 refers to the tier information 402 to acquire a value of the default tier for the access destination virtual volume from the default tier column 1304, and returns the value (S1704). When the determination result of Step S1703 is "NO", the tier calculation processing module 403 returns the value indicating the calculated tentative tier (S1705).

Figure 18:
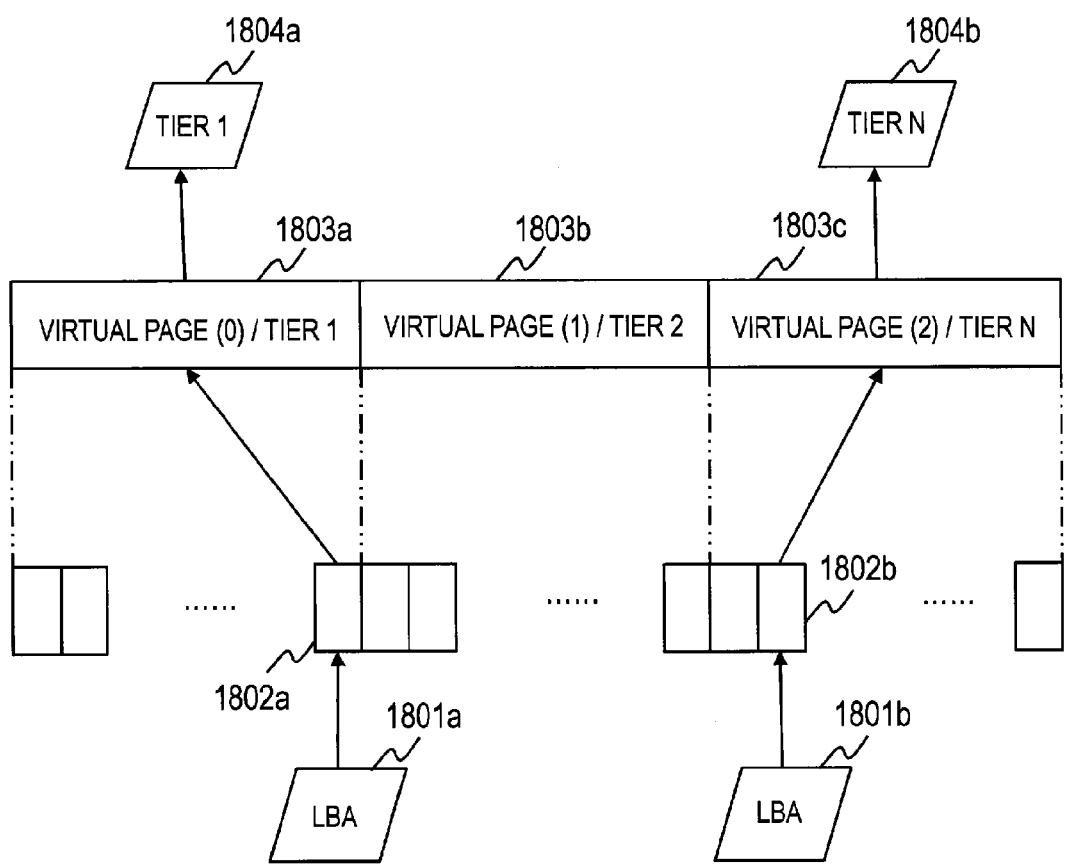
FIG. 18 is a diagram illustrating an example of a method of calculating a tentative tier within the flowchart of the tier calculation processing of FIG. 17 according to the first embodiment of this invention.

FIG. 18 is a diagram illustrating an example of the method of calculating the tentative tier of Step S1702 within the flowchart of FIG. 17. The tier calculation processing module 403 acquires, as an input, a value of a start LBA 1801a of the I/O request 602. As illustrated in FIG. 7, the I/O request 602 includes the values indicating the start LBA, the block count, the identifier of the virtual volume, and the operation type. In this embodiment, it is assumed that the block count designated in the I/O request is one.

In the host apparatus 101, the management unit for the virtual volume is a block, and the respective blocks are designated by LBAs. On the other hand, in the block storage apparatus 103, the management unit for the virtual volume is a page (virtual page), which is designated by a page number. The blocks (LBAs) and the virtual pages (page numbers) are subjected to straight mapping. The straight mapping represents a method of continuously associating LBAs to pages belonging thereto by division using a ratio between one page size and one LBA size.

FIG. 18 corresponds to the virtual volume VVOL(0) 605 indicated by a record 1306 within the tier information 402 of FIG. 13. In this example, the page size of the virtual volume VVOL(0) 605 is 5,120 bytes. In the virtual volume VVOL(0) 605, data of the respective pages is stored in the tiers described in the tier column 1302. For example, the page number "0" is mapped to Tier1, and the page number "1" is mapped to Tier2.

The block may have any unit size, and here, is set to have a size of 512 bytes. One page has a size of 5,120 bytes, and hence one virtual page receives 10 blocks. Accordingly, on the virtual volume VVOL(0) 605, zeroth to ninth blocks are mapped to the virtual page of the page number "0", in other words, zeroth to ninth LBAs are mapped to the page number "0" (1803a). In the same manner, 10th to 19th LBAs are mapped to the page number "1" (1803b), and 20th to 29th LBAs are mapped to the page number "2" (1803c).

In FIG. 18, when the start LBA 1801a designated in the I/O request is a ninth LBA 1802a, the tier calculation processing module 403 maps this LBA to the page number "0" (1803a). The tier calculation processing module 403 identifies a tentative tier 1804a thereof as Tier1 from the tier information 402.

When a start LBA 1801b designated in the I/O request is a 21st LBA 1802b, the tier calculation processing module 403 maps this LBA to the page number "2" (1803c). The tier calculation processing module 403 identifies a tentative tier 1804b thereof as TierN from the tier information 402.

If the page size is reduced, the accuracy of the hierarchical control can be enhanced, while on the other hand, there occurs a trade-off that deteriorates the performance in general. It is possible that different block storage apparatus 103 use mutually different page sizes to perform the hierarchical control. By thus calculating the page at an access destination LBA based on a correspondence between an LBA unit and the page size, there are advantages that an access destination page can be calculated from the LBA for a short processing time and that the block storage apparatus (volumes) subjected to the hierarchical control by the different page sizes can be simultaneously used.

Figure 19:
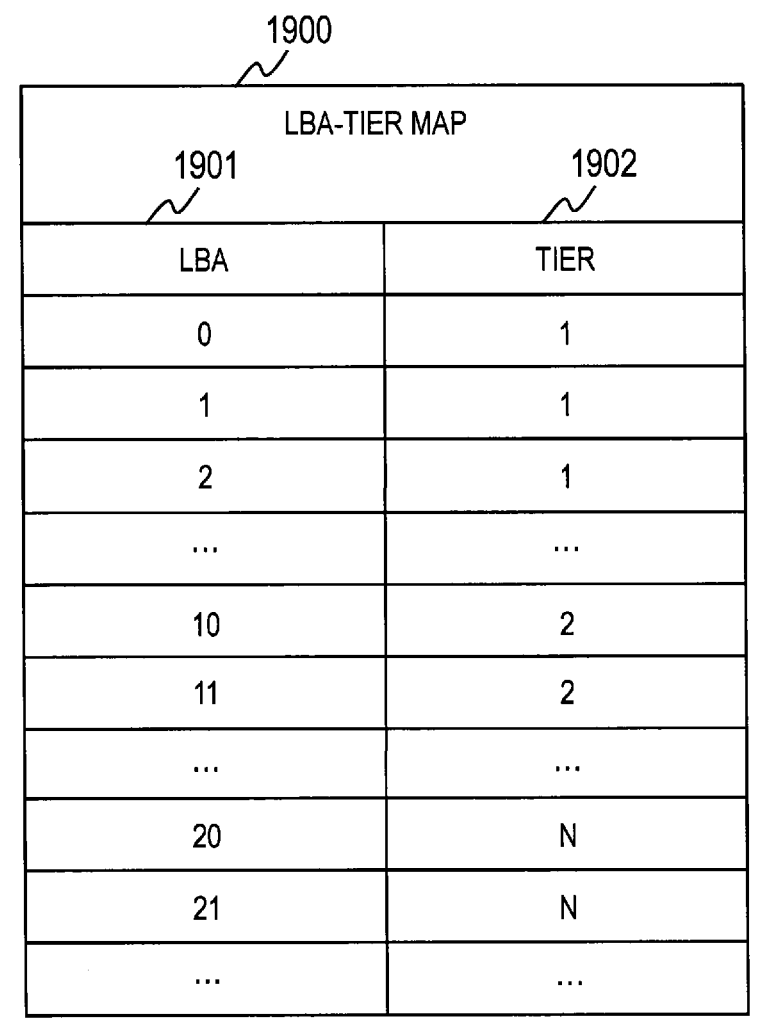

FIG. 19 illustrates an example of a mapping table 1900 between the LBA and the tier, which is calculated in Step S1702 of calculating the tentative tier within the flowchart of the tier calculation processing of Step S1506 of FIG. 17. The mapping table 1900 includes an LBA column 1901 and a tier column 1902. The tier information acquisition program 401 can use the LBA (column 1901) as a key to acquire the corresponding tier (column 1902).

In this manner, a calculation result relating to the mapping between the LBA and the tier may be cached. The caching is advantageous in that wasteful recalculation can be eliminated. The tier information acquisition program 401 may calculate the straight mapping every time without caching the mapping table 1900.

Figure 20:
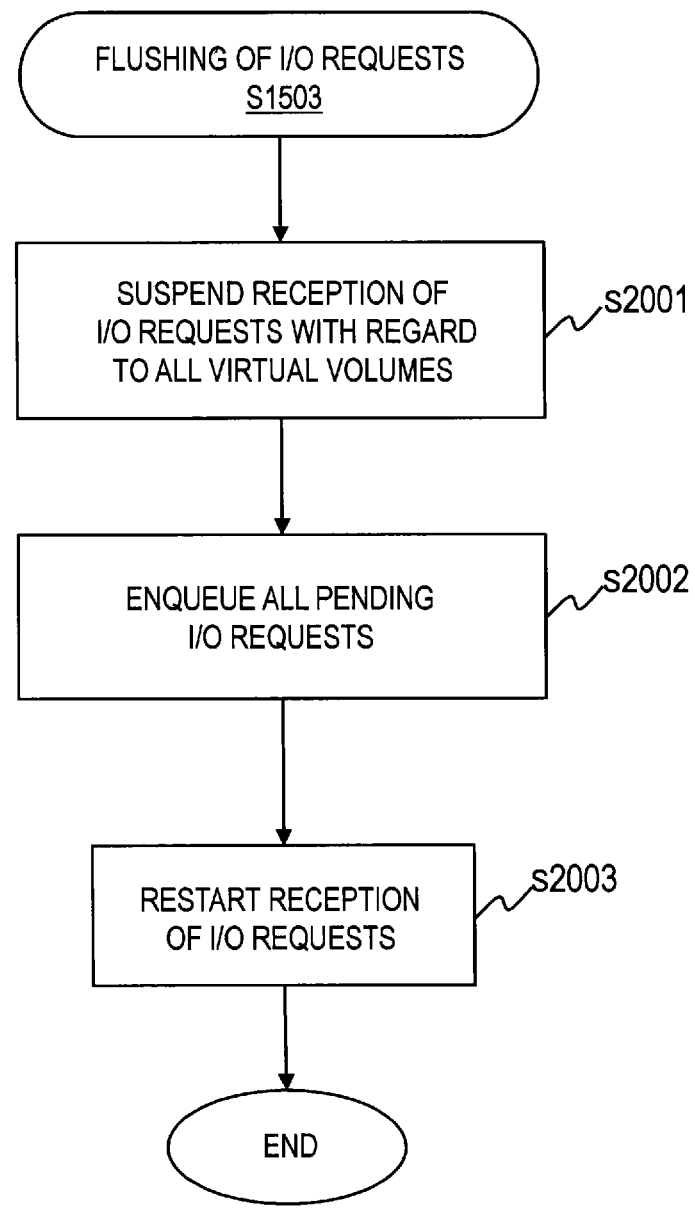
FIG. 20 is a flowchart of the flushing of the I/O requests within the flowchart of FIG. 15B according to the first embodiment of this invention.

FIG. 20 is a flowchart of the flushing of the I/O requests in Step S1503 within the flowchart of FIG. 15B. In this step, the flush processing module 409 of the host apparatus 101 first suspends reception of the I/O requests with regard to all the virtual volumes used by the host apparatus 101 (S2001). Subsequently, the flush processing module 409 enqueues all the currently pending I/O requests on the tier queue 406 to the request queue 410 (S2002). Finally, the I/O control program 404 restarts receiving the I/O request (S2003).

As described above, the access destination storage area of the I/O request according to the above-mentioned embodiment belongs to the single tier. For example, when the block count designated in the I/O request is one, the access destination address (access destination storage area) always corresponds to a single tier. On the other hand, when the block count designated in the I/O request is arbitrarily set, the access destination storage area (address) of the I/O request may cover the plurality of tiers. In other words, the tiers to which a plurality of blocks of the access destination of the I/O request belong may differ (be uneven).

In such a configuration example, by partitioning the I/O request, the I/O control program 404 can limit the access destination address area of one I/O request within a unit tier. Specifically, the I/O control program 404 identifies the tier of each of access destination blocks (each of access destination LBAs) of the input I/O request, and causes the blocks belonging to the different tiers to be included in different I/O requests. In each of the I/O requests obtained as a result thereof, the tier of all the access destination blocks is the same. Typically, when continuous LBAs are mapped to the same tier, those continuous LBAs are included in one I/O request.

The description of this embodiment is directed to the method in which the host apparatus 101 acquires the information on the tier of the access destination address, but the acquisition of the information according to this embodiment is not limited to the information on the tier and is effective for the information stored on the storage apparatus in general.

In the above-mentioned embodiment, the I/O control is performed under a policy that the I/O request with respect to Tier1 is given a higher priority than the I/O request with respect to Tier2. In addition to the tier of the I/O request, the determination of the priority can be based on a condition different therefrom. For example, the I/O control program 404 determines the priority based on the tier of the I/O request and an attribute of an access destination file, and in one example, calculates the priority from the tier of the I/O request and owner information on the file.

EXAMPLE 2

Figure 21:
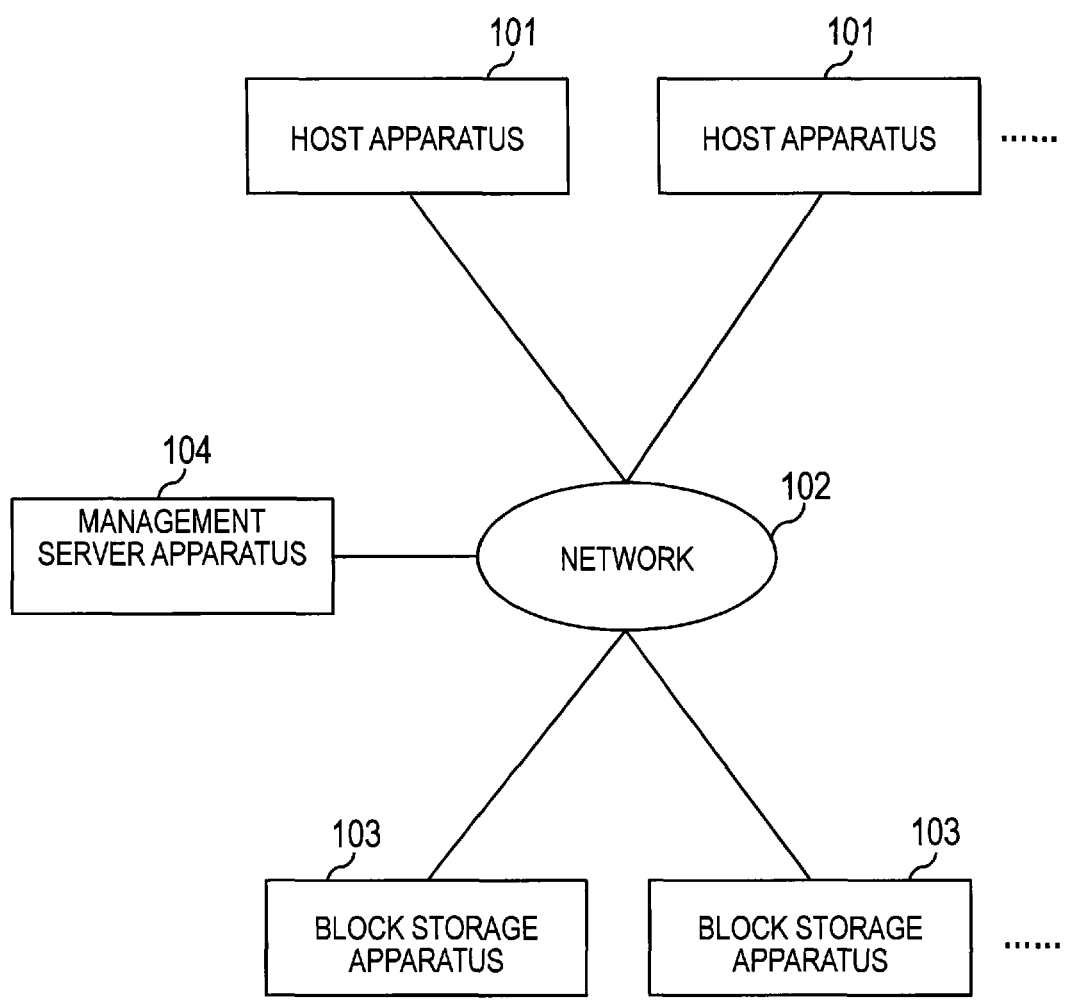
FIG. 21 is a block diagram schematically illustrating a configuration example of a system according to a second embodiment of this invention.

Hereinafter, a second embodiment of this invention is described referring to the accompanying drawings. In this embodiment, the management server apparatus 104 is included in addition to the host apparatus 101 and the block storage apparatus 103. FIG. 21 is a block diagram schematically illustrating a configuration example of a system according to the second embodiment. The management server apparatus 104 is coupled to the network 102, and can communicate to/from the host apparatus 101 and the block storage 103.

Figure 22:
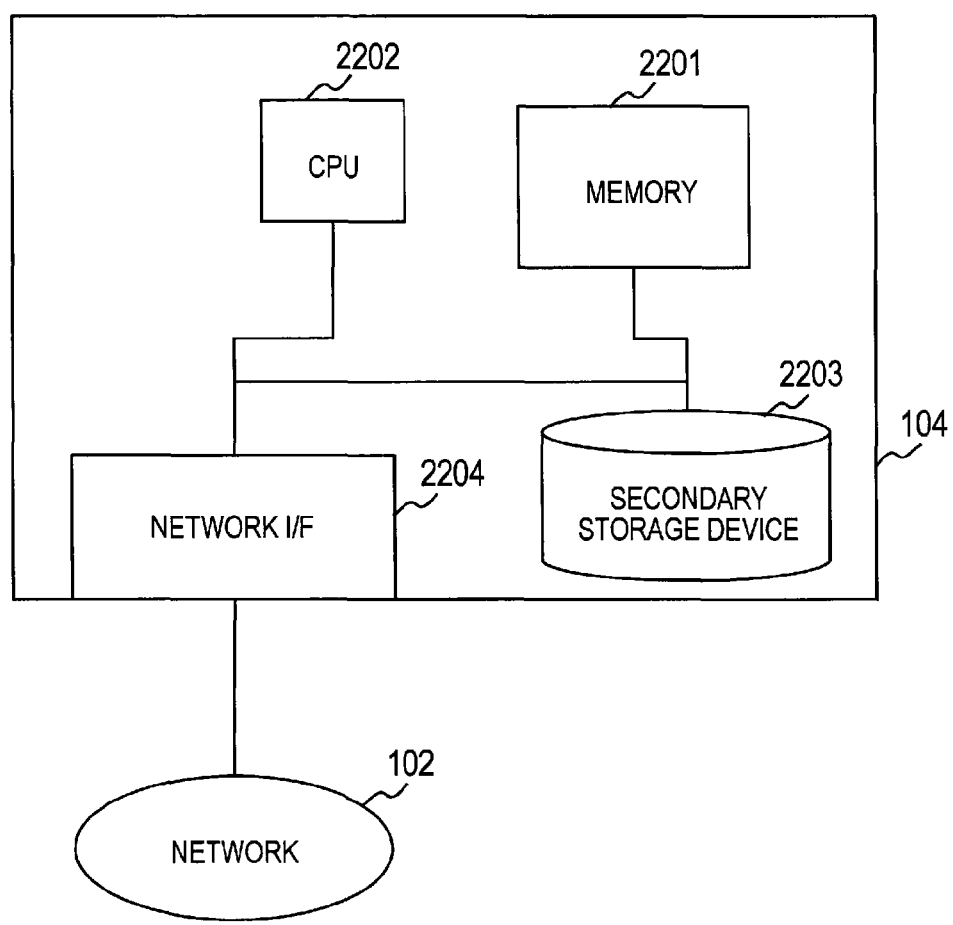
FIG. 22 is a block diagram schematically illustrating a hardware configuration example of a management server apparatus according to the second embodiment of this invention.

FIG. 22 is a block diagram schematically illustrating a hardware configuration example of the management server apparatus 104. The management server apparatus 104 of this embodiment is a computer, and includes a CPU 2202 being a processor, a memory 2201 being a main storage device, a secondary storage device 2203, and a network interface (I/F) 2204. Those are communicably coupled to one another through an internal bus.

The CPU 2202 calls a program stored in the memory 2201, performs processing by operating in accordance with the program, and realizes a predetermined function of the management server apparatus 104. The memory 2201 stores programs executed by the CPU 2202 and information (data) necessary for execution of the programs. As described later, the program includes an OS (not shown) in addition to programs described later with reference to FIG. 23.

The network interface 2204 is, for example, a network interface card (NIC) or a host bus adapter (HBA). The network interface 2204 is coupled to the data network 102, and the management server apparatus 104 uses the network interface 2204 to transmit/receive information to/from the block storage apparatus 103 and the host apparatus 101 via the network 102.

Figure 23:
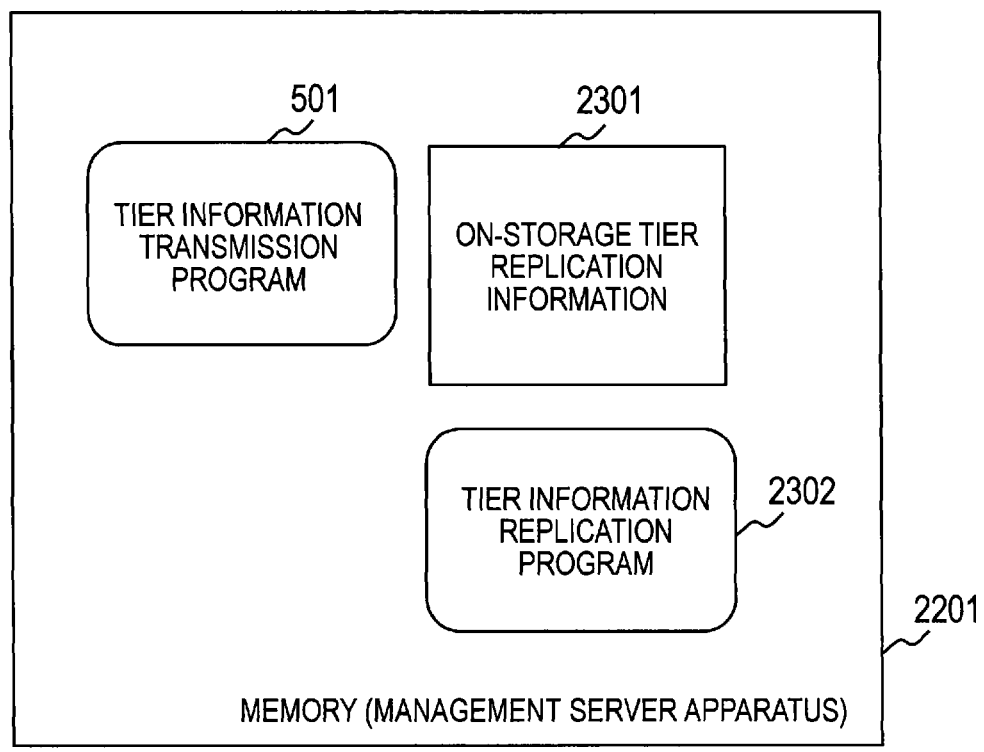
FIG. 23 illustrates a configuration of programs and information (data) that are stored in a memory of the management server apparatus according to the second embodiment of this invention.

FIG. 23 illustrates a configuration of programs and information (data) that are stored in a memory 2201 of the management server apparatus 104. The memory 2201 stores the tier information transmission program 501, on-storage tier replication information 2301, and a tier information replication program 2302. The on-storage tier replication information 2301 has the same structure as that of the on-storage tier information 504. The tier information replication program 2302 copies the entire on-storage tier information 504 to the on-storage tier replication information 2301.

Figure 24:
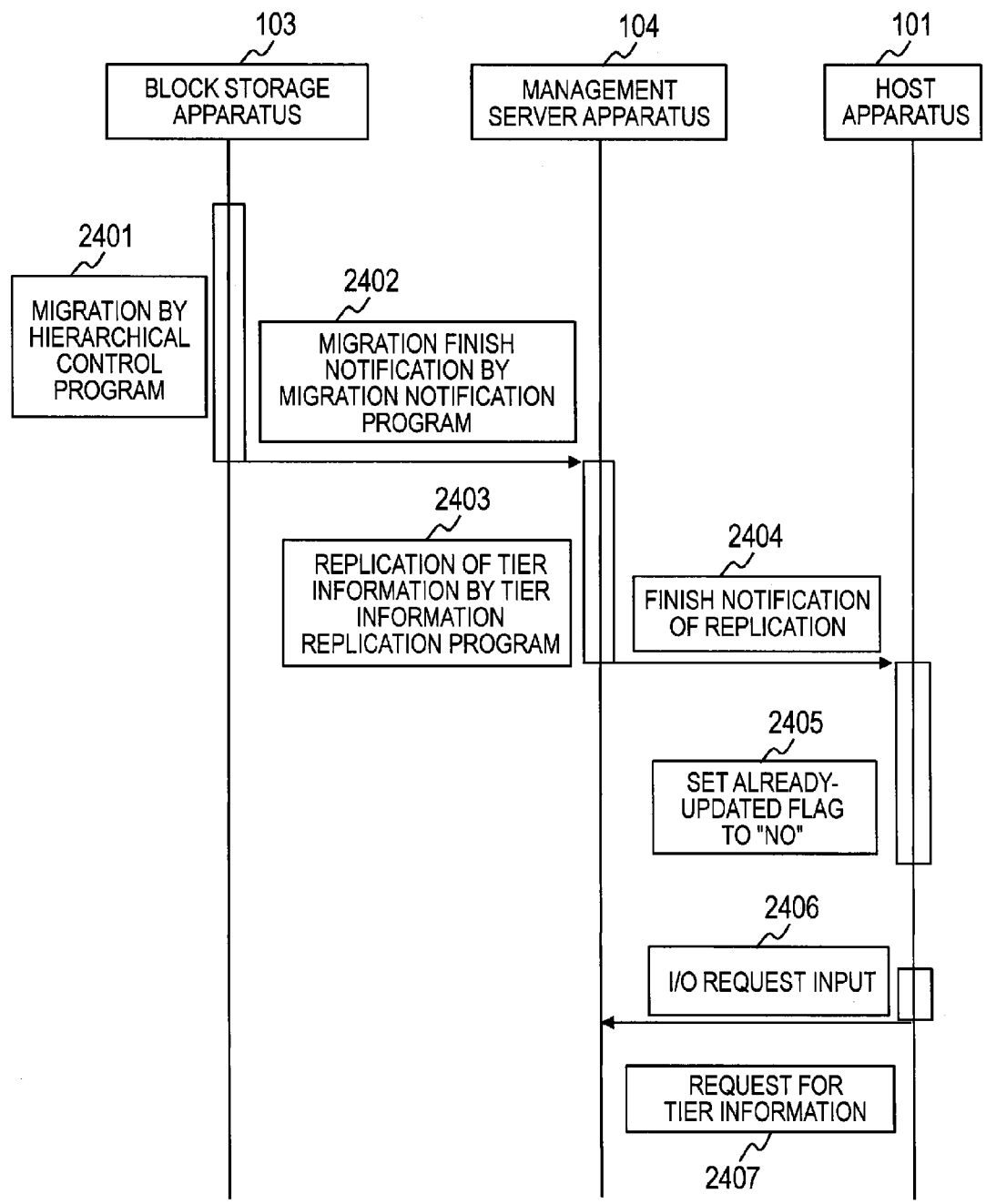
FIG. 24 is a sequence diagram illustrating an example of operations performed by the host apparatus, the block storage apparatus, and the management server apparatus according to the second embodiment of this invention.

FIG. 24 is a sequence diagram illustrating an example of operations performed by the host apparatus 101, the block storage apparatus 103, and the management server apparatus 104 according to the second embodiment. In the block storage apparatus 103, when the hierarchical control program 502 finishes data relocation processing by the inter-tier data migration within the virtual volume (2401), the migration notification program 505 transmits a migration (data relocation) finish notification to the management server apparatus 104 (2402). This allows the management server apparatus 104 to quickly know the updating of the tier information performed by the inter-tier relocation.

When the hierarchical control program 502 finishes the data migration of all the pages that are to be migrated in the data relocation processing (2401), the migration notification program 505 transmits a finish notification. The condition on which the data relocation processing is executed depends on the design. For example, the data relocation processing is executed at a predefined time instant, or executed when the number of pages that are to be migrated reaches a predefined number.

When receiving the migration finish notification, the management server apparatus 104 executes the tier information replication program 2302, and copies the entire on-storage tier information 504 to the on-storage tier replication information 2301 (2403). When replication is finished, the tier information replication program 2302 (management server apparatus 104) transmits a finish notification of the replication to the host apparatus 101 (2402). This allows the host apparatus 101 to quickly know the updating of the tier information.

When receiving the finish notification of the replication, the tier information acquisition program 401 of the host apparatus 101 sets all the fields of the already-updated flag column 1305 within the tier information 402 to "NO" (2405). The tier information acquisition program 401 may not switch the already-updated flag in response to all the finish notifications of the replication. For example, the already-updated flag may be switched when other conditions such as a lapse of a predefined time are also satisfied. The host computer 101 may use the finish notification of the replication for other processing.

When acquiring the I/O request (2406), the tier information acquisition program 401 requests the management server apparatus 104 to transmit the tier information (2407). In the first embodiment, the host apparatus 101 issues the request to the block storage apparatus 103 in order to update the tier information 402, but in the second embodiment, the request is issued to the management server apparatus 104. A request method thereof is the same as in the first embodiment.

One of the features of this embodiment is that the transmission of the tier information, which is performed by the block storage apparatus 103 in the first embodiment, is performed by the management server apparatus 104 instead. This feature produces an effect of reducing queries for the tier information made to the block storage apparatus 103. In particular, the feature is effective in a case where a large number of host apparatus 101 that use the block storage apparatus 103 exist. On the other hand, in the first embodiment, the management server apparatus 104 is unnecessary because of the I/O control based on the tier.

Another one of the features of this embodiment is that the already-updated flag within the tier information 402 is set to "NO" with a finish notification of the migration as a trigger. This can prevent the tier information 402 that has not been synchronized with the on-storage tier information 504 from being used after the data relocation is finished on the block storage apparatus 103.

In the first embodiment, the host apparatus 101 directly receives the finish notification of the migration from the block storage apparatus 103, which may be used as a trigger to set the already-updated flag within the tier information 402 to "NO". Further, with the same trigger, the information representing the relationship between the page and the tier within the tier information 402 may be updated.

Constantly maintaining the tier information 402 to the latest information is effective in order to maximize the effect of the I/O control program 404. The updating of the tier information 402 is not necessarily performed in the processing of Step S1502 with an input 2406 of the I/O request (corresponding to Step S1401 within the flowchart of FIG. 14) as a trigger.

For example, by performing the updating during a time slot in which use by the user does not occur, it is possible to reduce the overhead at a time of the use by the user. For example, the migration may be performed during nighttime in which the use by the user scarcely occurs, and the updating of the tier information 402 may be performed immediately after the migration is finished.

The description of this embodiment involves communications between apparatus in which the apparatus that have received the notifications (2402 and 2404) query notification sources for the information (2403 and 2407), but the information to be queried may be included in the notifications.

In the above-mentioned embodiment, the block storage apparatus 103 determines a migration destination tier for the data relocation performed in the inter-tier data migration, and the management server apparatus 104 acquires the information on the tier configuration (configuration indicating a correlation between the page and the tier) determined by the block storage apparatus 103. Alternatively, the management server apparatus 104 may determine the migration destination tier of the page data, and may notify the block storage apparatus 103 of a migration destination. With this configuration, the management server apparatus 104 does not have to acquire the tier information from the block storage apparatus 103, and needs only to transmit the tier information created and managed by itself to the host apparatus 101.

In the above-mentioned embodiment, the host apparatus 101 acquires the information (tier information) representing the relationship between the page and the tier from the management server apparatus 104, and determines, from the information, the tier to which the access destination LBA belongs. Alternatively, the management server apparatus 104 may identify the tier to which an access LBA of the I/O request belongs, and may transmit the information representing the above-mentioned tier to the host apparatus 101. This is the same as in the first embodiment, and the block storage apparatus 103 may identify the access destination tier instead of the host apparatus 101.

In the above-mentioned embodiment, the management server apparatus 104 transmits tier configuration information on one or a plurality of volumes of one block storage apparatus to the host apparatus 101. In another example, the management server apparatus 104 may transmit the information on the tier configuration of the volume of a plurality of block storage apparatus to the host apparatus 101.

The host apparatus 101 uses the information on the tier configuration of the volume of the plurality of block storage apparatus 103, and controls I/Os between the plurality of block storage apparatus. For example, when there is a difference in the performance between the block storage apparatus such as between the tiers, it is possible to perform the I/O control in consideration of the difference.

A management system of this configuration example is constituted by the management server apparatus 104, but the management system may be constituted by a plurality of computers. One of the plurality of computers may be a computer for display, and the plurality of computers may realize processing equivalent to a management computer in order to increase the speed and reliability of management processing.

The embodiments of this invention have been described above, but this invention is not limited to the above-mentioned embodiments. The respective components of the above-mentioned embodiments can be easily changed, added, and converted by a person skilled in the art within the scope of this invention. A part or the entirety of the respective configurations, functions, processing modules, processing means, and the like that are described above may be realized by hardware by, for example, being designed as an integrated circuit.

A part of the configuration of one embodiment can be replaced by the configuration of another embodiment, and the configuration of one embodiment can also be added to the configuration of another embodiment. A part of the configuration of each embodiment can be subjected to addition/deletion/substitution of the configuration of another embodiment.

It should be understood that this invention can be achieved by supplying the system or the apparatus with the non-transitory storage medium that stores program code of software that realizes the functions of this embodiments and reading and executing, by a computer (or CPU or MPU) of the system or the apparatus, the program code stored in the non-transitory storage medium.

In this case, the program code read from the non-transitory storage medium realizes itself the functions of the above-mentioned embodiments, and the non-transitory storage medium that stores the program code constitutes this invention. It should be understood that this invention includes not only the case where the functions of the above-mentioned embodiments are realized by executing the program code read by the computer but also a case where, based on instructions of the program code, the OS or the like operating on the computer performs a part or an entirety of actual processing and the functions of the above-mentioned embodiments are realized by the processing.

The invention claimed is:

1. A computer system, comprising:
a storage apparatus for allocating real storage areas of a plurality of tiers of a tiered real storage area pool to a volume, and migrating and relocating data within the volume between the plurality of tiers; and
a host apparatus that accesses the volume provided by the storage apparatus,
wherein the host apparatus is configured to:
refer to tier information including information on a corresponding one of the plurality of tiers to which an access destination address within the volume belongs to identify the corresponding one of the plurality of tiers to which the access destination address belongs;
refer to settings predetermined for the plurality of tiers to perform I/O control for the access destination address based on settings of the identified corresponding one of the plurality of tiers; and
control an order of issuing I/O requests to the storage apparatus in the I/O control,
wherein the host apparatus includes a tier queue that stores the I/O requests to be issued to the storage apparatus,
wherein the settings predetermined for the plurality of tiers define an interval for storing an I/O request to the tier queue for each of the plurality of tiers, and
wherein the settings predetermined for the plurality of tiers further define an upper limit count of I/O requests stored in the tier queue for each of the plurality of tiers.

2. The computer system according to claim 1,
wherein the volume is a virtual volume to which the real storage areas are allocated from the tiered real storage area pool based on access to the volume made by the host apparatus,
wherein the storage apparatus is configured to allocate a real storage area of a predetermined default tier in response to access to an unallocated address to which a real storage area has not been yet allocated within the volume,
wherein the host apparatus is configured to determine that a corresponding one of the plurality of tiers to which the unallocated address belongs is the predetermined default tier, and
wherein the host apparatus is configured to execute the I/O control based on settings of the default tier for the unallocated address.

3. The computer system according to claim 1, wherein the host apparatus is configured to receive the tier information from the storage apparatus.

4. The computer system according to claim 1,
wherein the storage apparatus is configured to perform hierarchical control on the volume in units of pages,
wherein the tier information includes information on a corresponding one of the plurality of tiers to which each of a plurality of pages within the volume belongs,
wherein the host apparatus is configured to identify a corresponding one of the plurality of pages of the access destination address from a correspondence relationship between addresses of the volume and the corresponding ones of the plurality of pages, and wherein the host apparatus is configured to refer to the tier information to identify the corresponding one of the plurality of tiers of the access destination address from the identified corresponding one of the plurality of pages.

5. The computer system according to claim 1, wherein the host apparatus is configured to perform, with regard to at least one tier of the plurality of tiers, scheduling for issuing a plurality of I/O requests within the at least one tier.

6. The computer system according to claim 1, further comprising a management system for managing the storage apparatus, wherein the host apparatus is configured to acquire the tier information from the management system.

7. The computer system according to claim 6, wherein the storage apparatus is configured to notify the management system that data relocation between the plurality of tiers has been finished, and wherein the management system is configured to acquire the tier information including information on an updated tier configuration from the storage apparatus in response to the notification that the data relocation has been finished.

8. The computer system according to claim 7, wherein the management system is configured to notify the host apparatus that the tier information has been updated.

9. The computer system according to claim 8, wherein:

the host apparatus is configured to request the management system to transmit the tier information after receiving the notification from the management system; and the management system is configured to transmit the tier information to the host apparatus in response to the request.

10. The method of controlling I/Os according to claim 1, wherein the tier queue comprises a plurality of pending queues.

11. The method of controlling I/Os according to claim 10, wherein priorities of the plurality of pending queues can be compared with each other by a number of I/O requests thereof that can be enqueued per unit time.

12. A method of controlling I/Os with respect to a storage apparatus by a host apparatus, the storage apparatus allocating real storage areas of a plurality of tiers in a tiered real storage area pool to a volume, and migrating and relocating data within the volume between the plurality of tiers, the method comprising:

referring, by the host apparatus, to tier information including information on a corresponding one of the plurality of tiers to which an access destination address in the volume belongs to identify the corresponding one of the plurality of tiers to which the access destination address belongs;

referring, by the host apparatus, to settings predetermined for the plurality of tiers to perform I/O control for the access destination address based on settings of the identified corresponding one of the plurality of tiers;

and controlling, by the host apparatus, an order of issuing I/O requests to the storage apparatus in the I/O control, wherein the host apparatus includes a tier queue that stores the I/O requests to be issued to the storage apparatus, wherein the settings predetermined for the plurality of tiers define an interval for storing an I/O request to the tier queue for each of the plurality of tiers, and wherein the settings predetermined for the plurality of tiers further define an upper limit count of I/O requests stored in the tier queue for each of the plurality of tiers.

13. The method of controlling I/Os according to claim 12, wherein the host apparatus includes a cache area for caching data received from the storage apparatus, and wherein the I/O control for the access destination address includes control of data to be destaged from the cache area.

* * * * *